(12) United States Patent
Wei et al.

(10) Patent No.: US 12,432,777 B2
(45) Date of Patent: Sep. 30, 2025

(54) CHANNEL STATE INFORMATION TRIGGERING FOR UPLINK DOMINANT TRAFFIC

(71) Applicant: Qualcomm Incorporated, San Diego, CA (US)

(72) Inventors: Chao Wei, Beijing (CN); Jing Lei, San Diego, CA (US); Chenxi Hao, Beijing (CN); Peter Pui Lok Ang, San Diego, CA (US); Huilin Xu, Temecula, CA (US); Wanshi Chen, San Diego, CA (US); Krishna Kiran Mukkavilli, San Diego, CA (US); Le Liu, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 17/773,921

(22) PCT Filed: Nov. 15, 2019

(86) PCT No.: PCT/CN2019/118712
§ 371 (c)(1),
(2) Date: May 3, 2022

(87) PCT Pub. No.: WO2021/092878
PCT Pub. Date: May 20, 2021

(65) Prior Publication Data
US 2022/0386376 A1  Dec. 1, 2022

(51) Int. Cl.
*H04W 74/0816* (2024.01)
*H04W 72/23* (2023.01)
*H04W 72/54* (2023.01)

(52) U.S. Cl.
CPC ....... *H04W 74/0816* (2013.01); *H04W 72/23* (2023.01); *H04W 72/54* (2023.01)

(58) Field of Classification Search
CPC ... H04L 5/0044; H04L 5/0053; H04L 5/0055; H04L 5/0057; H04L 5/0058;
(Continued)

(56) References Cited

U.S. PATENT DOCUMENTS 8,681,651 B2 * 3/2014 Bhattad ................. H04W 72/27
  370/246
9,480,063 B2 * 10/2016 Bhattad ............... H04L 25/0226
(Continued)

FOREIGN PATENT DOCUMENTS

CN  103516464 A  1/2014
CN  115515236 A  * 12/2022  ............ H04W 24/10
(Continued)

OTHER PUBLICATIONS

Supplementary European Search Report—EP19952924—Search Authority—The Hague—Jun. 29, 2023.
(Continued)

*Primary Examiner* — Eric Nowlin
(74) *Attorney, Agent, or Firm* — Holland & Hart LLP

(57) ABSTRACT

Methods, systems, and devices for wireless communications are described. Generally, the described techniques provide for efficiently reporting channel state information (CSI) with limited overhead. In one aspect, if a user equipment (UE) is configured to transmit data and CSI to a base station periodically, the UE may transmit the CSI when the UE has data to transmit to the base station. In particular, the UE may transmit data and a CSI report during a transmission opportunity if the UE has data to transmit in the transmission opportunity. Otherwise, the UE may suppress transmission of the CSI report. In another aspect, a UE may be configured
(Continued)

to transmit CSI to a base station when downlink channel conditions change. In particular, the UE may request to report CSI to the base station when channel conditions change, and the base station may trigger the UE to report the CSI after receiving the request.

26 Claims, 16 Drawing Sheets

(58) Field of Classification Search
CPC .... H04L 5/0078; H04L 5/0094; H04W 72/23; H04W 72/54; H04W 74/0816
See application file for complete search history.

(56) References Cited

U.S. PATENT DOCUMENTS

| | | | |
|---|---|---|---|
| 10,284,351 B2* | 5/2019 | Ahn | H04L 5/0055 |
| 10,404,404 B2* | 9/2019 | Gao | H04B 7/0645 |
| 10,587,387 B2* | 3/2020 | Ahn | H04L 1/18 |
| 11,071,095 B2* | 7/2021 | Harrison | H04L 5/0057 |
| 11,108,495 B2* | 8/2021 | Gao | H04L 1/1812 |
| 11,272,390 B2* | 3/2022 | Takeda | H04W 28/04 |
| 11,425,748 B2* | 8/2022 | Aiba | H04W 72/21 |
| 11,553,464 B2* | 1/2023 | Yamazaki | H04L 5/0057 |
| 11,849,451 B2* | 12/2023 | Yamamoto | H04W 72/23 |
| 11,910,320 B2* | 2/2024 | Yang | H04B 7/0626 |
| 11,929,957 B2* | 3/2024 | Gao | H04W 24/10 |
| 12,317,259 B2* | 5/2025 | Takeda | H04L 1/0061 |
| 2009/0227209 A1* | 9/2009 | Craig | H04L 1/003 455/67.13 |
| 2012/0113816 A1* | 5/2012 | Bhattad | H04L 25/0226 370/246 |
| 2014/0177519 A1* | 6/2014 | Bhattad | H04W 72/27 370/329 |
| 2014/0198677 A1 | 7/2014 | Xu et al. | |
| 2016/0182137 A1 | 6/2016 | Onggosanusi et al. | |
| 2016/0205579 A1 | 7/2016 | Cheng et al. | |
| 2017/0250781 A1 | 8/2017 | Golitschek Edler Von Elbwart et al. | |
| 2017/0366998 A1* | 12/2017 | Lee | H04L 5/00 |
| 2018/0227908 A1* | 8/2018 | Wang | H04L 5/0057 |
| 2018/0278398 A1* | 9/2018 | Ahn | H04L 1/1671 |
| 2018/0279293 A1* | 9/2018 | Harrison | H04B 7/0639 |
| 2019/0141677 A1* | 5/2019 | Harrison | H04W 72/04 |
| 2019/0174479 A1* | 6/2019 | Yamazaki | H04L 5/0057 |
| 2019/0207662 A1 | 7/2019 | Zhou et al. | |
| 2019/0215781 A1* | 7/2019 | Jeon | H04W 76/32 |
| 2019/0222349 A1* | 7/2019 | Gao | H04B 7/0645 |
| 2019/0222397 A1* | 7/2019 | Ahn | H04L 5/00 |
| 2019/0253964 A1 | 8/2019 | Li et al. | |
| 2019/0349125 A1* | 11/2019 | Gao | H04L 1/0027 |
| 2019/0364591 A1* | 11/2019 | Berglund | H04L 1/0027 |
| 2020/0045675 A1* | 2/2020 | Harrison | H04L 1/0026 |
| 2020/0077386 A1* | 3/2020 | Papasakellariou | H04L 1/1854 |
| 2020/0169364 A1* | 5/2020 | Hao | H04L 5/0044 |
| 2020/0322113 A1* | 10/2020 | Gao | H04L 5/001 |
| 2020/0383132 A1* | 12/2020 | Yang | H04W 74/0808 |
| 2021/0014881 A1* | 1/2021 | Aiba | H04L 1/1822 |
| 2021/0037406 A1* | 2/2021 | Takeda | H04L 5/0057 |
| 2021/0051509 A1* | 2/2021 | Wu | H04L 1/1887 |
| 2021/0274488 A1* | 9/2021 | Yamamoto | H04W 72/20 |
| 2022/0360307 A1* | 11/2022 | Matsumura | H04L 1/0026 |
| 2022/0394618 A1* | 12/2022 | Yang | H04W 52/0232 |
| 2023/0199797 A1* | 6/2023 | Yi | H04W 72/232 370/329 |

FOREIGN PATENT DOCUMENTS

| | | | | |
|---|---|---|---|---|
| EP | 4102884 A1 * | 12/2022 | | H04W 24/10 |
| WO | WO-2020061156 A1 | 3/2020 | | |
| WO | WO-2022047348 A2 * | 3/2022 | | H04W 72/23 |
| WO | WO-2022147394 A1 * | 7/2022 | | H04B 7/0617 |
| WO | WO-2024016313 A1 * | 1/2024 | | H04B 7/0626 |

OTHER PUBLICATIONS

International Search Report and Written Opinion—PCT/CN2019/118712—ISA/EPO—Aug. 18, 2020.
VIVO: "Discussion on the Enhancements to Configured Grants", 3GPP TSG RAN WG1 #98bis, R1-1910207, Oct. 4, 2019 (Oct. 4, 2019) sections 2-3, 9 pages.

* cited by examiner

CHANNEL STATE INFORMATION TRIGGERING FOR UPLINK DOMINANT TRAFFIC

CROSS REFERENCE

The present Application is a 371 national stage filing of International PCT Application No. PCT/CN2019/118712 by Wei et al., entitled "CHANNEL STATE INFORMATION TRIGGERING FOR UPLINK DOMINANT TRAFFIC," filed Nov. 15, 2019, which is assigned to the assignee hereof, and which is expressly incorporated by reference in its entirety herein.

BACKGROUND

The following relates generally to wireless communications and more specifically to channel state information (CSI) triggering for uplink dominant traffic.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to report CSI to a base station to indicate downlink channel conditions, and the base station may use the CSI to improve the quality of downlink transmissions to the UE. For example, the CSI may include a channel quality indicator (CQI), and the base station may use the CQI to identify appropriate parameters (e.g., a modulation and coding scheme (MCS)) for transmitting downlink data to the UE. Current techniques for reporting CSI from a UE to a base station may be inefficient for certain types of traffic (e.g., for uplink dominant traffic).

SUMMARY

The described techniques relate to improved methods, systems, devices, and apparatuses that support channel state information (CSI) triggering for uplink dominant traffic. Generally, the described techniques at a UE provide for efficiently reporting CSI to a base station with limited overhead. In one aspect, if a UE is configured to transmit data and CSI to a base station periodically in a configured grant physical uplink shared channel (CG-PUSCH), the UE may transmit the CSI when the UE has data to transmit to the base station in the CG-PUSCH. In particular, the UE may transmit data and a CSI report during a transmission opportunity of a CG-PUSCH if the UE has data to transmit in the transmission opportunity of the CG-PUSCH. Otherwise, the UE may suppress transmission of the CSI report. In another aspect, a UE may be configured to transmit CSI to a base station when downlink channel conditions change. In particular, when the UE identifies a change in channel conditions, the UE may request to report CSI to the base station, and the base station may trigger the UE to report the CSI after receiving the request.

A method of wireless communication at a UE is described. The method may include identifying that the UE is configured for transmitting a channel state information report to a base station on a configured grant uplink data channel, identifying a first opportunity for transmitting data and the channel state information report on the configured grant uplink data channel, determining whether the UE has data to transmit during the first opportunity, transmitting data and the channel state information report on the configured grant uplink data channel during the first opportunity if the UE has data to transmit during the first opportunity, and suppressing transmission of the channel state information report during the first opportunity on the configured grant uplink data channel if the UE does not have data to transmit during the first opportunity.

An apparatus for wireless communication at a UE is described. The apparatus may include a processor, memory coupled with the processor, and instructions stored in the memory. The instructions may be executable by the processor to cause the apparatus to identify that the UE is configured for transmitting a channel state information report to a base station on a configured grant uplink data channel, identify a first opportunity for transmitting data and the channel state information report on the configured grant uplink data channel, determine whether the UE has data to transmit during the first opportunity, transmit data and the channel state information report on the configured grant uplink data channel during the first opportunity if the UE has data to transmit during the first opportunity, and suppress transmission of the channel state information report during the first opportunity on the configured grant uplink data channel if the UE does not have data to transmit during the first opportunity.

Another apparatus for wireless communication at a UE is described. The apparatus may include means for identifying that the UE is configured for transmitting a channel state information report to a base station on a configured grant uplink data channel, identifying a first opportunity for transmitting data and the channel state information report on the configured grant uplink data channel, determining whether the UE has data to transmit during the first opportunity, transmitting data and the channel state information report on the configured grant uplink data channel during the first opportunity if the UE has data to transmit during the first opportunity, and suppressing transmission of the channel state information report during the first opportunity on the configured grant uplink data channel if the UE does not have data to transmit during the first opportunity.

A non-transitory computer-readable medium storing code for wireless communication at a UE is described. The code may include instructions executable by a processor to identify that the UE is configured for transmitting a channel state information report to a base station on a configured grant uplink data channel, identify a first opportunity for transmitting data and the channel state information report on the configured grant uplink data channel, determine whether the UE has data to transmit during the first opportunity, transmit data and the channel state information report on the configured grant uplink data channel during the first opportunity if the UE has data to transmit during the first opportunity, and suppress transmission of the channel state information report during the first opportunity on the configured grant uplink data channel if the UE does not have data to transmit during the first opportunity.

In some examples of the method, apparatuses, and non-transitory computer-readable medium described herein, suppressing transmission of the channel state information report during the first opportunity may include operations, features, means, or instructions for suppressing transmitting the channel state information report on any physical channel during the first opportunity. Some examples of the method, apparatuses, and non-transitory computer-readable medium described herein may further include operations, features, means, or instructions for determining, subsequent to suppressing transmission of the channel state information report during the first opportunity on the configured grant uplink data channel, that the UE may have data to transmit during a second opportunity on the configured grant uplink data channel, and transmitting the data and the channel state information report during the second opportunity on the configured grant uplink data channel based on determining that the UE may have data to transmit during the second opportunity.

Some examples of the method, apparatuses, and non-transitory computer-readable medium described herein may further include operations, features, means, or instructions for receiving a configuration of a first periodicity for transmitting channel state information reports to the base station and a second periodicity for transmitting data to the base station, where the first periodicity may be an integer multiple of the second periodicity. Some examples of the method, apparatuses, and non-transitory computer-readable medium described herein may further include operations, features, means, or instructions for receiving a configuration of a first periodicity for transmitting channel state information reports to the base station, where the configuration indicates an index of the configured grant uplink data channel linked to the channel state information reports and associated with a second periodicity for transmitting data to the base station, where the first periodicity may be an integer multiple of the second periodicity.

In some examples of the method, apparatuses, and non-transitory computer-readable medium described herein, transmitting the data and the channel state information report during the first opportunity on the configured grant uplink data channel may include operations, features, means, or instructions for encoding the data and the channel state information report using different encoding schemes, mapping the data and the channel state information report to different resource elements, and multiplexing the data and the channel state information report during the first opportunity on the configured grant uplink data channel. In some examples of the method, apparatuses, and non-transitory computer-readable medium described herein, transmitting the channel state information during the first opportunity on the configured grant uplink data channel may include operations, features, means, or instructions for transmitting the channel state information report in a medium access control (MAC) control element (MAC-CE) during the first opportunity on the configured grant uplink data channel.

Some examples of the method, apparatuses, and non-transitory computer-readable medium described herein may further include operations, features, means, or instructions for determining a channel quality indicator to include in the channel state information report based on a previous precoding matrix indicator reported in aperiodic channel state information feedback or a precoder matrix cycling over a codebook subset. Some examples of the method, apparatuses, and non-transitory computer-readable medium described herein may further include operations, features, means, or instructions for transmitting, in the MAC-CE, an indication of whether the channel quality indicator may be based on the previous precoding matrix indicator reported in the aperiodic channel state information feedback or the precoder matrix cycling over the codebook subset.

A method of wireless communication at a UE is described. The method may include identifying a change of downlink channel conditions based on one or more downlink transmissions received from a base station, transmitting a request for the UE to report channel state information to the base station based on the identifying, receiving an indication that the UE is to report the channel state information to the base station based on transmitting the request, and reporting the channel state information to the base station.

An apparatus for wireless communication at a UE is described. The apparatus may include a processor, memory coupled with the processor, and instructions stored in the memory. The instructions may be executable by the processor to cause the apparatus to identify a change of downlink channel conditions based on one or more downlink transmissions received from a base station, transmit a request for the UE to report channel state information to the base station based on the identifying, receive an indication that the UE is to report the channel state information to the base station based on transmitting the request, and report the channel state information to the base station.

Another apparatus for wireless communication at a UE is described. The apparatus may include means for identifying a change of downlink channel conditions based on one or more downlink transmissions received from a base station, transmitting a request for the UE to report channel state information to the base station based on the identifying, receiving an indication that the UE is to report the channel state information to the base station based on transmitting the request, and reporting the channel state information to the base station.

A non-transitory computer-readable medium storing code for wireless communication at a UE is described. The code may include instructions executable by a processor to identify a change of downlink channel conditions based on one or more downlink transmissions received from a base station, transmit a request for the UE to report channel state information to the base station based on the identifying, receive an indication that the UE is to report the channel state information to the base station based on transmitting the request, and report the channel state information to the base station.

In some examples of the method, apparatuses, and non-transitory computer-readable medium described herein, identifying the change of downlink channel conditions may include operations, features, means, or instructions for determining that a channel quality indicator or precoding matrix indicator associated with the downlink channel conditions may be different from a previously reported channel quality indicator or precoding matrix indicator. In some examples of the method, apparatuses, and non-transitory computer-readable medium described herein, transmitting the request for reporting the channel state information may include operations, features, means, or instructions for transmitting the request in a MAC-CE of a configured grant uplink data channel or in a dedicated control channel. In some examples of the method, apparatuses, and non-transitory computer-readable medium described herein, the request for the UE to report the channel state information includes a one-bit channel state information update request.

A method of wireless communication at a base station is described. The method may include receiving, from a UE, a request for the UE to report channel state information to the base station, transmitting an indication that the UE is to report the channel state information to the base station based on receiving the request, and receiving the channel state information from the UE based on transmitting the indication.

An apparatus for wireless communication at a base station is described. The apparatus may include a processor, memory coupled with the processor, and instructions stored in the memory. The instructions may be executable by the processor to cause the apparatus to receive, from a UE, a request for the UE to report channel state information to the base station, transmit an indication that the UE is to report the channel state information to the base station based on receiving the request, and receive the channel state information from the UE based on transmitting the indication.

Another apparatus for wireless communication at a base station is described. The apparatus may include means for receiving, from a UE, a request for the UE to report channel state information to the base station, transmitting an indication that the UE is to report the channel state information to the base station based on receiving the request, and receiving the channel state information from the UE based on transmitting the indication.

A non-transitory computer-readable medium storing code for wireless communication at a base station is described. The code may include instructions executable by a processor to receive, from a UE, a request for the UE to report channel state information to the base station, transmit an indication that the UE is to report the channel state information to the base station based on receiving the request, and receive the channel state information from the UE based on transmitting the indication.

Some examples of the method, apparatuses, and non-transitory computer-readable medium described herein may further include operations, features, means, or instructions for determining that previous channel state information received from the UE may be invalid based on receiving the request for the UE to report the channel state information to the base station. In some examples of the method, apparatuses, and non-transitory computer-readable medium described herein, receiving the request for the UE to report the channel state information may include operations, features, means, or instructions for receiving the request in a MAC-CE of a configured grant uplink data channel or in a dedicated control channel. In some examples of the method, apparatuses, and non-transitory computer-readable medium described herein, the request for the UE to report the channel state information includes a one-bit channel state information update request.

DETAILED DESCRIPTION

In some wireless communications systems, a user equipment (UE) may be configured to perform channel measurements on downlink signals received from a base station and report the channel measurements to the base station. In such systems, the UE may transmit the results of the channel measurements in channel state information (CSI) feedback to the base station. Using the CSI feedback, the base station may identify suitable parameters for downlink transmissions to the UE to improve the likelihood that the downlink transmissions are received by the UE. In some cases, communications between the UE and the base station may be uplink dominant, and conventional techniques for facilitating CSI reporting may be deficient. In one example, if a UE is configured to periodically report CSI to a base station, the CSI reported by the UE may not be used by the base station when there is no downlink traffic (e.g., resulting in wasted resources). In another example, if a base station is configured to trigger CSI reporting from multiple UEs, the overhead associated with transmitting a trigger command to each of the multiple UEs may be high.

As described herein, a UE may support efficient techniques for reporting CSI to a base station with limited overhead for uplink dominant traffic. In one aspect, if a UE is configured to transmit data and CSI to a base station periodically in a configured grant physical uplink shared channel (CG-PUSCH), the UE may transmit the CSI in the CG-PUSCH when the UE has data to transmit to the base station in the CG-PUSCH. In particular, the UE may transmit data and a CSI report during a transmission opportunity of a CG-PUSCH if the UE has data to transmit in the transmission opportunity of the CG-PUSCH. Otherwise, the UE may suppress transmission of the CSI report. In another aspect, a UE may be configured to transmit CSI to a base station when downlink channel conditions change. In particular, when the UE identifies a change in channel conditions, the UE may request to report CSI to the base station, and the base station may trigger the UE to report the CSI after receiving the request.

Aspects of the disclosure introduced above are described below in the context of a wireless communications system. Examples of processes and signaling exchanges that support CSI triggering for uplink dominant traffic are then described. Aspects of the disclosure are further illustrated by and described with reference to apparatus diagrams, system diagrams, and flowcharts that relate to CSI triggering for uplink dominant traffic.

Figure 1:
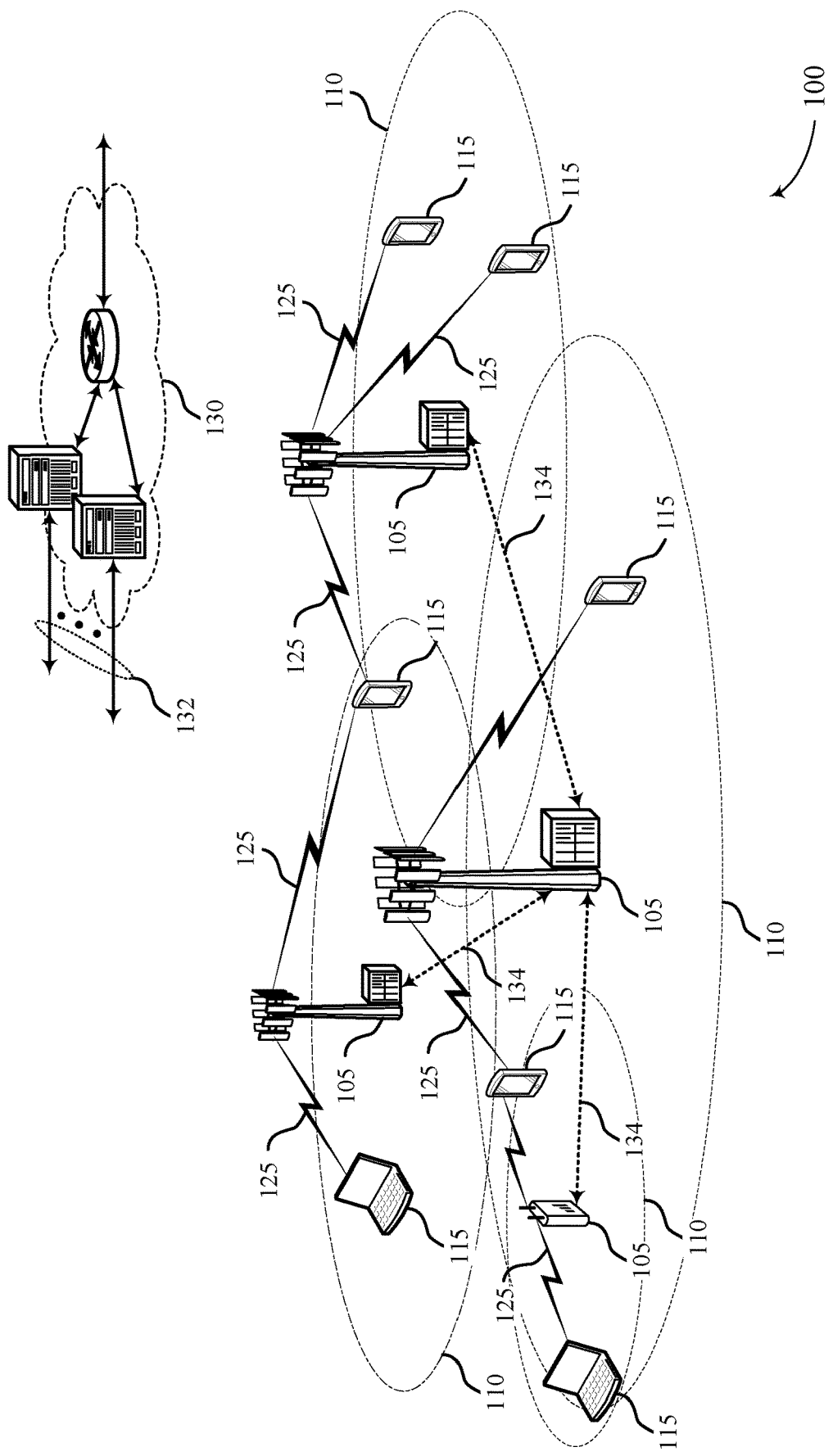
FIG. 1 illustrates an example of a wireless communications system that supports channel state information (CSI) triggering for uplink dominant traffic in accordance with aspects of the present disclosure.

FIG. 1 illustrates an example of a wireless communications system 100 that supports CSI triggering for uplink dominant traffic in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

A UE 115 in wireless communications system 100 may be configured to report CSI feedback to a base station 105 which the base station 105 may use to identify suitable parameters for downlink transmissions to the UE 115. CSI feedback may be periodic, aperiodic, or semi-persistent, and the mechanism used to trigger CSI feedback from a UE 115 may be higher or lower layer signaling. For periodic CSI reporting, a UE 115 may report CSI in a PUCCH based on a configured reporting periodicity and offset, or the UE 115 may transmit the CSI with data in a PUSCH (e.g., piggyback on a PUSCH) when the UE 115 is scheduled to transmit data in the PUSCH at the same time (e.g., in a same slot). For semi-persistent CSI reporting, a UE 115 may report CSI in a PUCCH or PUSCH after receiving activation signaling from a base station 105 (e.g., based on the activation or deactivation by a MAC control element (MAC-CE)). Once the UE 115 is activated to report CSI, the UE 115 may report the CSI based on a higher layer configured periodicity. For aperiodic CSI reporting, a UE 115 may receive DCI that may dynamically indicate one of a number of higher layer CSI reporting settings, and, based on the indication in the DCI, the UE 115 may report CSI in a PUSCH in accordance with the indicated CSI reporting setting. Thus, in each of the above examples, a base station 105 may trigger a UE 115 to report CSI either periodically, semi-persistently, or aperiodically (e.g., a network-based triggering mechanism).

In some cases, communications between the UE 115 and the base station 105 may be downlink dominant or balanced between downlink and uplink. In such cases, the techniques described above for facilitating or triggering CSI reporting may be suitable (e.g., since the CSI may be used frequently by the base station 105 to improve the quality of downlink transmissions). In other cases, however, communications between the UE 115 and the base station 105 may be uplink dominant. One example of uplink dominant traffic may be for video surveillance (e.g., or other sensor applications, where a UE 115 may be primarily transmitting data to a base station 105). In this example, downlink data transmissions may be used to acknowledge uplink data transmissions (e.g., in application layer feedback or an RRC response message). In such cases, conventional techniques for facilitating or triggering CSI reporting may be deficient. In particular, the network-based CSI triggering mechanism described may consider (e.g., only consider) CSI reporting for downlink dominant traffic and may not be optimal for uplink dominant traffic.

In one example, if a UE 115 is configured to periodically report CSI to a base station 105, the CSI reported by the UE 115 may not be used by the base station 105 when there is no downlink traffic (e.g., resulting in resources being wasted). In another example, if a base station 105 is configured to trigger CSI reporting from multiple UEs, the overhead associated with transmitting a trigger command to each of the multiple UEs may be high. For instance, although a UE 115 may be triggered to report CSI when there is downlink traffic, the trigger command may be sent on a PDCCH to each UE 115, and, when the number of UEs 115 is high, the base station 105 may not be able to trigger aperiodic CSI reporting for each UE 115 with an individual PDCCH. Further, since for uplink dominant traffic (e.g., for a fixed surveillance camera), the downlink channel may be slow-varying, the CSI may not change very often, and the aperiodic reporting of unchanged CSI may cause an unnecessary waste of both downlink and uplink resources. In wireless communications system 100, a UE 115 may support efficient techniques for reporting CSI to a base station 105 with limited overhead for uplink dominant traffic.

Figure 2:
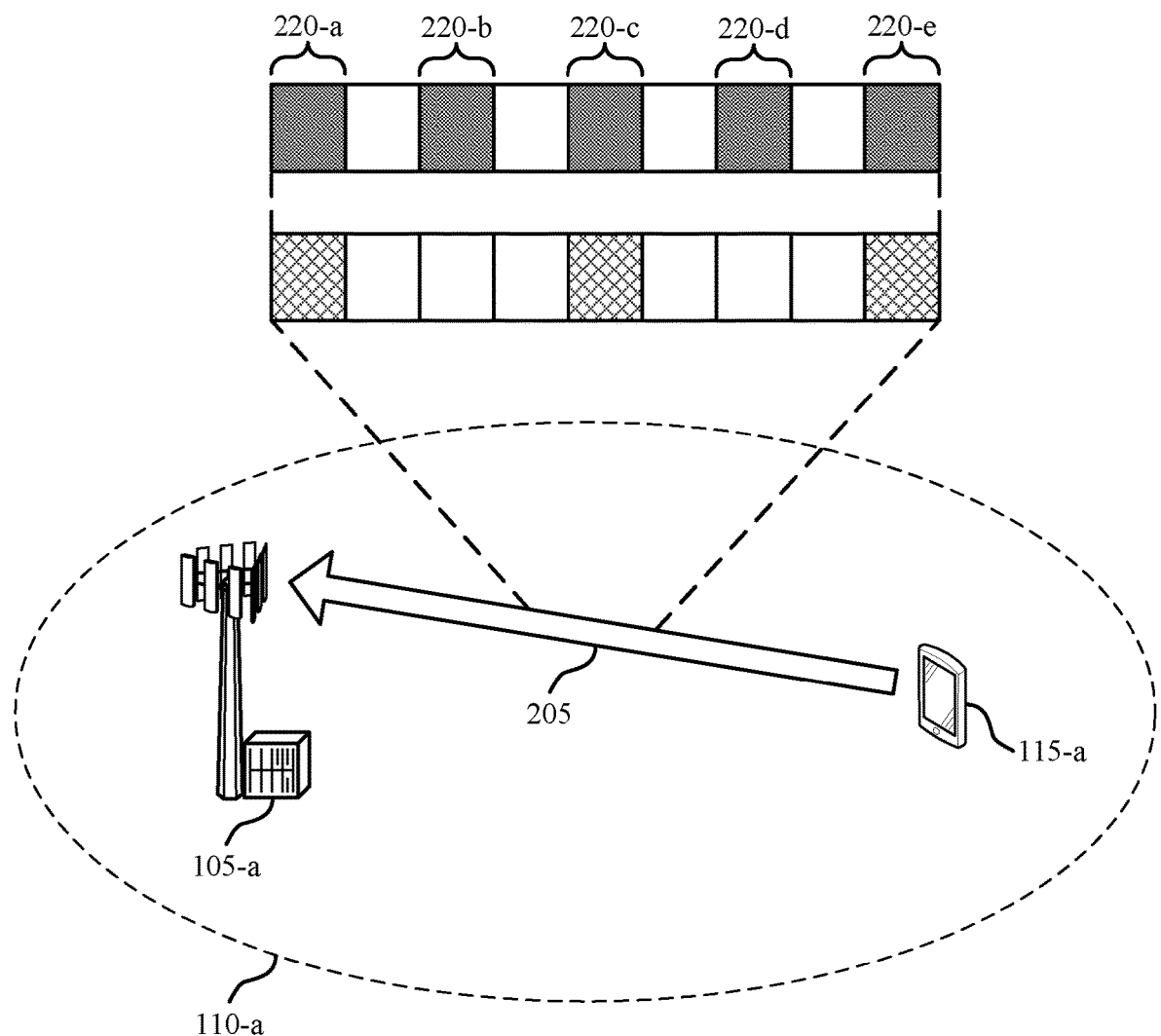
FIG. 2 illustrates an example of a wireless communications system that supports CSI triggering for uplink dominant traffic in accordance with aspects of the present disclosure.

FIG. 2 illustrates an example of a wireless communications system 200 that supports CSI triggering for uplink dominant traffic in accordance with aspects of the present disclosure. The wireless communications system 200 includes a UE 115-a, which may be an example of a UE 115 described with reference to FIG. 1. The wireless communications system 200 also includes a base station 105-a, which may be an example of a base station 105 described with reference to FIG. 1. The base station 105-a may provide communication coverage for a coverage area 110-a. UE 115-a in coverage area 110-a may transmit uplink signals to base station 105-a on resources of a carrier 205. The wireless communications system 200 may implement aspects of wireless communications system 100. For example, the UE 115-a in wireless communications system 200 may support efficient techniques for reporting CSI to the base station 105-a with limited overhead for uplink dominant traffic.

In the example of FIG. 2, the UE 115-a may be configured for periodic CSI reporting in a CG-PUSCH (e.g., instead of a PUCCH). The base station 105-a may configure the UE 115-a with a first set of periodic resources 210 for transmitting data and a second set of periodic resources 215 for reporting CSI. The periodic resources 210 for transmitting data may be referred to as a CG-PUSCH and may correspond to periodically scheduled frequency resources (e.g., one or more resource blocks (RBs)) in a PUSCH allocated for periodic transmissions from the UE 115-a. The CG-PUSCH configured for UE 115-a may be used for transmission when data (e.g., mobile originated (MO) data) is present in buffers of the UE 115-a for transmission to the base station 105-a, and may be unused by UE 115-a when it does not have MO data. For example, a CG-PUSCH may include periodic uplink resources, and the UE 115-a may use a subset of the resources for transmission. In some cases, multiple UEs 115 may be scheduled on the same resources, and concurrent transmissions may be differentiated by the base station 105-a based on cover codes or other coding applied to the transmissions. Thus, each set of time/frequency resources of the CG-PUSCH may or may not carry data transmitted by the UE 115-a without DCI. Further, the periodic resources 215 for reporting CSI may be a portion or all of the CG-PUSCH resources (e.g., a portion or all of the periodic resources 210 for transmitting data). In one example, the UE 115-a may be configured to report CSI with a same periodicity configured for transmitting data, where all CG-PUSCH resources may be configured for reporting CSI. In another example, the UE 115-a may be configured to report CSI with a different periodicity from the periodicity configured for transmitting data (e.g., a larger periodicity that is an integer multiple of the periodicity configured for transmitting data), where a subset of the CG-PUSCH resources may be configured for reporting CSI.

Thus, the first set of periodic resources 210 may be time and frequency resources allocated for CG-PUSCH, and the second set of periodic resources 215 may be a subset of the time and frequency resources allocated for the CG-PUSCH. In some cases, the base station 105-a may configure the first set of periodic resources 210 and the second set of periodic resources 215 together (e.g., in a single configuration or control message). In such cases, the base station 105-a may transmit a configuration to the UE 115-a including a CSI reporting configuration and a CG-PUSCH configuration, and the configuration may indicate a first offset and periodicity for transmitting data using the CG-PUSCH and a second offset and periodicity for reporting CSI via the CG-PUSCH (e.g., where the second offset may be zero or an integer multiple of the first periodicity configured for transmitting data in the CG-PUSCH). In other cases, the base station 105-a may configure the first set of periodic resources 210 separately from the second set of periodic resources 215 (e.g., in different control messages). The periodicity for reporting CSI via the CG-PUSCH may be linked to the periodicity of the CG-PUSCH. For example, the base station 105-a may transmit a CSI reporting configuration to the UE 115-a including a link to a CG-PUSCH configuration index, and the CSI reporting configuration may indicate a first offset and periodicity for reporting CSI in the CG-PUSCH corresponding to the indicated CG-PUSCH configuration index.

Once the UE 115-a identifies the periodic resources 210 for transmitting data and the periodic resources 215 for reporting CSI, the UE 115-a may then transmit data and CSI reports to the base station 105-a in one or more opportunities 220. The one or more opportunities may correspond to either time and frequency resources scheduled for transmitting data or time and frequency resources scheduled for transmitting data and a CSI report in accordance with the periodic resources 210 for transmitting data and the periodic resources 215 for reporting CSI. As described herein, the UE 115-a may transmit a CSI report in an opportunity 220 in the CG-PUSCH only when data is transmitted in the CG-PUSCH (e.g., CG-PUSCH is transmitted in the opportunity) and not when no data is transmitted in the CG-PUSCH (e.g., CG-PUSCH is not transmitted in the opportunity). That is, the UE 115-a may transmit a CSI report in an opportunity 220 of the CG-PUSCH corresponding to periodic resources 215 for reporting CSI if the UE 115-a has data to transmit in the opportunity 220 of the CG-PUSCH. Otherwise, the UE 115-a may suppress transmission of the CSI report in the opportunity 220 of the CG-PUSCH if the UE 115-a does not have data to transmit in the opportunity 220 in the CG-PUSCH. For example, the UE 115-a may not transmit using the opportunity 220 of the CG-PUSCH if the UE 115-*a* does not have data to transmit in the opportunity 220. As such, the UE 115-*a* may report CSI only when there is uplink traffic (e.g., since the UE may not transmit on the CG-PUSCH when there is no uplink data), and the CSI may then be used by the base station 105-*a* for scheduling the associated downlink acknowledgment message (e.g., application layer feedback).

As an example, the UE 115-*a* may identify a first opportunity 220-*a* for transmitting data and a CSI report on a CG-PUSCH to the base station 105-*a*. If the UE 115-*a* determines that the UE 115-*a* has data to transmit during the first opportunity 220-*a* on the CG-PUSCH, the UE 115-*a* may transmit the data and the CSI report during the first opportunity 220-*a* on the CG-PUSCH. Alternatively, if the UE 115-*a* determines that the UE 115-*a* does not have data to transmit during the first opportunity 220-*a* on the CG-PUSCH, the UE 115-*a* may suppress transmission of the CSI report during the first opportunity 220-*a* on the CG-PUSCH. In some cases, the UE 115-*a* may drop reporting of the CSI report scheduled for the first opportunity 220-*a*. Alternatively, the UE 115-*a* may defer reporting of the CSI report scheduled for the first opportunity 220-*a* to the next opportunity. For example, where the UE 115-*a* suppresses transmission of the CSI report during the first opportunity 220-*a*, the UE 115-*a* may determine that the UE 115-*a* has data to transmit in a second opportunity 220-*b*, and, although the second opportunity 220-*b* may not be scheduled for reporting CSI, the UE 115-*a* may transmit the data and the CSI report in the second opportunity 220-*b* on the CG-PUSCH. Deferred reporting may also be used, for example, in the case where the periodicity of reporting CSI is not an integer of the periodicity for CG-PUSCH. Thus, the UE 115-*a* may not report CSI on the opportunities configured for CSI (unless they happen to overlap in time with a CG-PUSCH opportunity), but instead may report CSI on the next CG-PUSCH opportunity subsequent to the CSI reporting opportunity where the UE 115-*a* has MO data to transmit.

In some cases, when the UE 115-*a* determines to transmit data and a CSI report in an opportunity 220 on the CG-PUSCH, the UE 115-*a* may transmit the CSI report in layer one (L1) signaling, or the UE 115-*a* may transmit the CSI report in a MAC-CE of the CG-PUSCH. If the UE 115-*a* is configured to transmit the CSI report in L1 signaling, the UE 115-*a* may encode the data and the CSI report using different encoding schemes (e.g., using separate channel coding), and the UE 115-*a* may map the data and the CSI report to different resource elements (e.g., using separate resource element mapping). The UE 115-*a* may then multiplex the data and the CSI report on the CG-PUSCH.

Alternatively, if the UE 115-*a* is configured to transmit the CSI report in a MAC-CE of the CG-PUSCH, the number of bits for the CSI report may be fixed (e.g., irrespective of the number of CSI reference signal (CSI-RS) ports for which measurements were performed and included in the CSI report). In some aspects, the UE 115-*a* may also avoid reporting a precoder matrix indicator (PMI) in the CSI report (e.g., since the number of bits for the CSI report may be limited). In such aspects, the channel quality indicator (CQI) included in the CSI report for a CSI-RS may be based on the PMI from the latest reported aperiodic CSI associated with the same CSI-RS or precoder cycling over a set of preconfigured precoders in a codebook subset (e.g., a PMI associated with a precoder cycling). Further, the UE 115-*a* may include an indication of the PMI (e.g., one-bit PMI) to indicate whether the precoder for CQI calculation is based on the PMI in the latest reported aperiodic CSI or based on precoder cycling.

Figure 3:
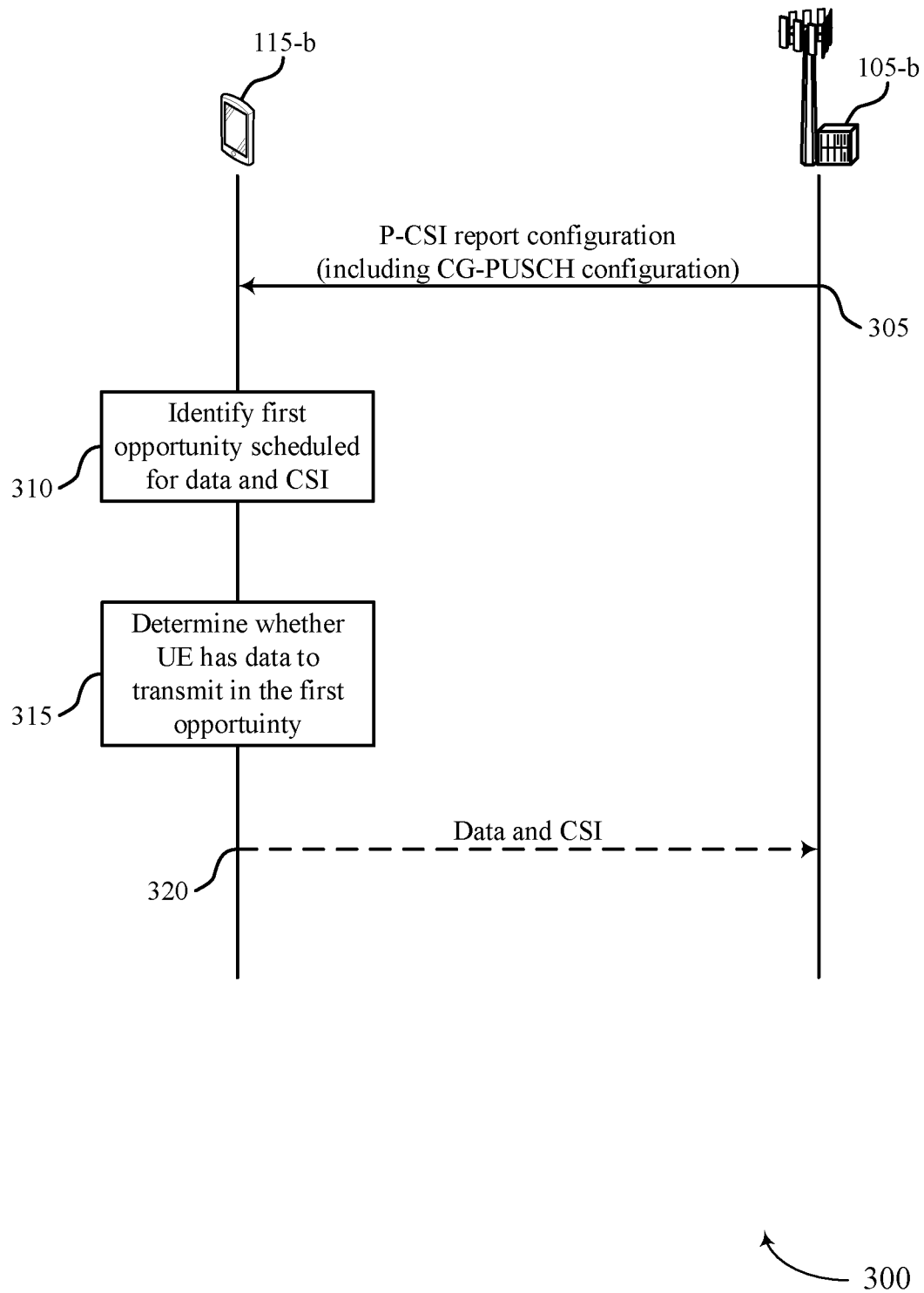
FIG. 3 illustrates an example of a process flow that supports CSI triggering for uplink dominant traffic in accordance with aspects of the present disclosure.

FIG. 3 illustrates an example of a process flow 300 that supports CSI triggering for uplink dominant traffic in accordance with aspects of the present disclosure. The process flow 300 illustrates aspects of techniques performed by a UE 115-*b*, which may be an example of a UE 115 described with reference to FIGS. 1 and 2. The process flow 300 also illustrates aspects of techniques performed by a base station 105-*b*, which may be an example of a base station 105 described with reference to FIGS. 1 and 2. As described herein, UE 115-*b* in process flow 300 may support efficient techniques for reporting CSI to the base station 105-*b* with limited overhead for uplink dominant traffic.

At 305, the base station 105-*b* may transmit a periodic CSI report configuration to the UE 115-*b* which may include a CG-PUSCH configuration or a link to a CG-PUSCH configuration index. The periodic CSI report configuration may allocate periodic resources for the UE 115-*b* to transmit CSI reports to the base station 105-*b*, and the CG-PUSCH configuration may allocate periodic resources for the UE 115-*b* to transmit data to the base station 105-*b*. For instance, the UE 115-*b* may receive, from the base station 105-*b*, a configuration of a first periodicity for transmitting CSI reports to the base station 105-*b* and a second periodicity for transmitting data to the base station 105-*b*. Alternatively, the UE 115-*b* may receive, from the base station 105-*b*, a configuration of a first periodicity for transmitting CSI reports to the base station 105-*b*, where the configuration indicates an index of the CG-PUSCH linked to the CSI reports that is associated with a second periodicity. In any case, the first periodicity may be an integer multiple (e.g., one or more) of the second periodicity.

Based on the configuration received at 305, the UE 115-*b* may identify that the UE 115-*b* is configured for transmitting a CSI report to the base station 105-*b* on a CG-PUSCH. At 310, UE 115-*b* may identify a first opportunity for transmitting data and the CSI report on the CG-PUSCH. At 315, the UE 115-*b* may determine whether the UE 115-*b* has data to transmit during the first opportunity on the CG-PUSCH. Then, if the UE 115-*b* has data to transmit during the first opportunity, at 320, the UE 115-*b* may transmit the data and the CSI report on the CG-PUSCH during the first opportunity. Alternatively, if the UE 115-*b* does not have data to transmit during the first opportunity, the UE 115-*b* may suppress transmission of the CSI report on the CG-PUSCH during the first opportunity. In some cases, suppressing transmission of the CSI report may include suppressing transmitting the CSI report on any physical channel during the first opportunity.

Thus, using the techniques described herein, for each P-CSI reporting instance in a CG-PUSCH, if data is transmitted in the CG-PUSCH due to uplink traffic, the UE 115-*b* may measure and report periodic CSI on the CG-PUSCH. Otherwise, the UE 115-*b* may not transmit data on the CG-PUSCH and may not report periodic CSI. In particular, when the UE 115-*b* identifies a transmit time for periodic CSI, and the UE 115-*b* determines that the UE 115-*b* has data to transmit at the transmit time for the periodic CSI on a CG-PUSCH, the UE 115-*b* may transmit the periodic CSI and the data on the CG-PUSCH at the transmit time. Alternatively, when the UE 115-*b* identifies a transmit time for periodic CSI, and the UE 115-*b* determines that the UE 115-*b* does not have data to transmit at the transmit time for the periodic CSI on a CG-PUSCH, the UE 115-*b* may not transmit the periodic CSI on the CG-PUSCH at the transmit time (e.g., no periodic CSI report for not transmitting the CG-PUSCH).

Figure 4:
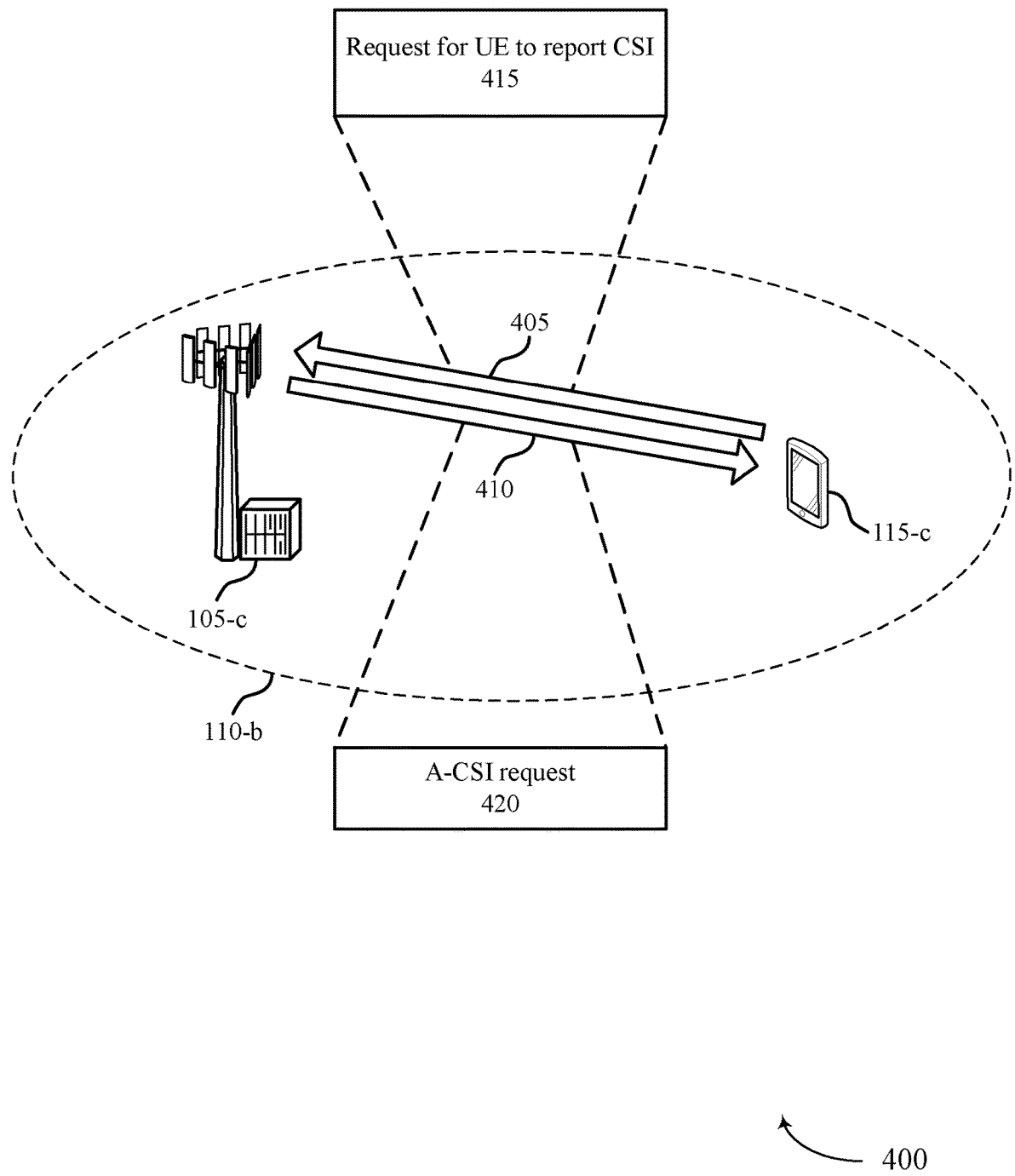
FIG. 4 illustrates an example of a wireless communications system that supports CSI triggering for uplink dominant traffic in accordance with aspects of the present disclosure.

FIG. 4 illustrates an example of a wireless communications system 400 that supports CSI triggering for uplink dominant traffic in accordance with aspects of the present disclosure. The wireless communications system 400 includes a UE 115-c, which may be an example of a UE 115 described with reference to FIGS. 1-3. The wireless communications system 400 also includes a base station 105-c, which may be an example of a base station 105 described with reference to FIGS. 1-3. The base station 105-a may provide communication coverage for a coverage area 110-b. UE 115-c in coverage area 110-b may transmit uplink signals to base station 105-c on resources of a carrier 405, and base station 105-c may transmit downlink signals to UE 115-c on resources of a carrier 410 (e.g., where carriers 405 and 410 may be the same or different carriers). The wireless communications system 400 may implement aspects of wireless communications system 100. For example, the UE 115-c in wireless communications system 400 may support efficient techniques for reporting CSI to the base station 105-c with limited overhead for uplink dominant traffic.

In the example of FIG. 4, UE 115-c may be configured to aperiodically report CSI to the base station 105-c. As described herein, to limit the overhead associated with triggering UEs 115 to report CSI, the UE 115-c may be configured to request to report CSI when the UE 115-c determines that channel conditions have changed. Thus, when the UE 115-c identifies a change in downlink channel conditions, the UE 115-c may transmit a request 415 for the UE 115-c to report CSI to the base station 105-c. The request 415 for the UE 115-c to report the CSI to the base station 105-c may be a one-bit CSI update request which may be sent on a CG-PUSCH using a MAC-CE or by a dedicated PUCCH resource. Base station 105-c may then determine that CSI previously reported by the UE 115-c is invalid (e.g., outdated), and base station 105-c may transmit an aperiodic request 420 (e.g., via DCI) for CSI from the UE 115-c. That is, after receiving the request 415 for the CSI update, the base station 105-c may assume that the previously reported CSI is outdated, and the base station 105-c may request (e.g., via DCI) for the UE 115-c to update the CSI (e.g., reusing the aperiodic CSI request or trigger field in the uplink grant of a PDCCH). The UE 115-c may then transmit a CSI report to the base station 105-c after receiving the request 420 for CSI from the base station 105-c.

Figure 5:
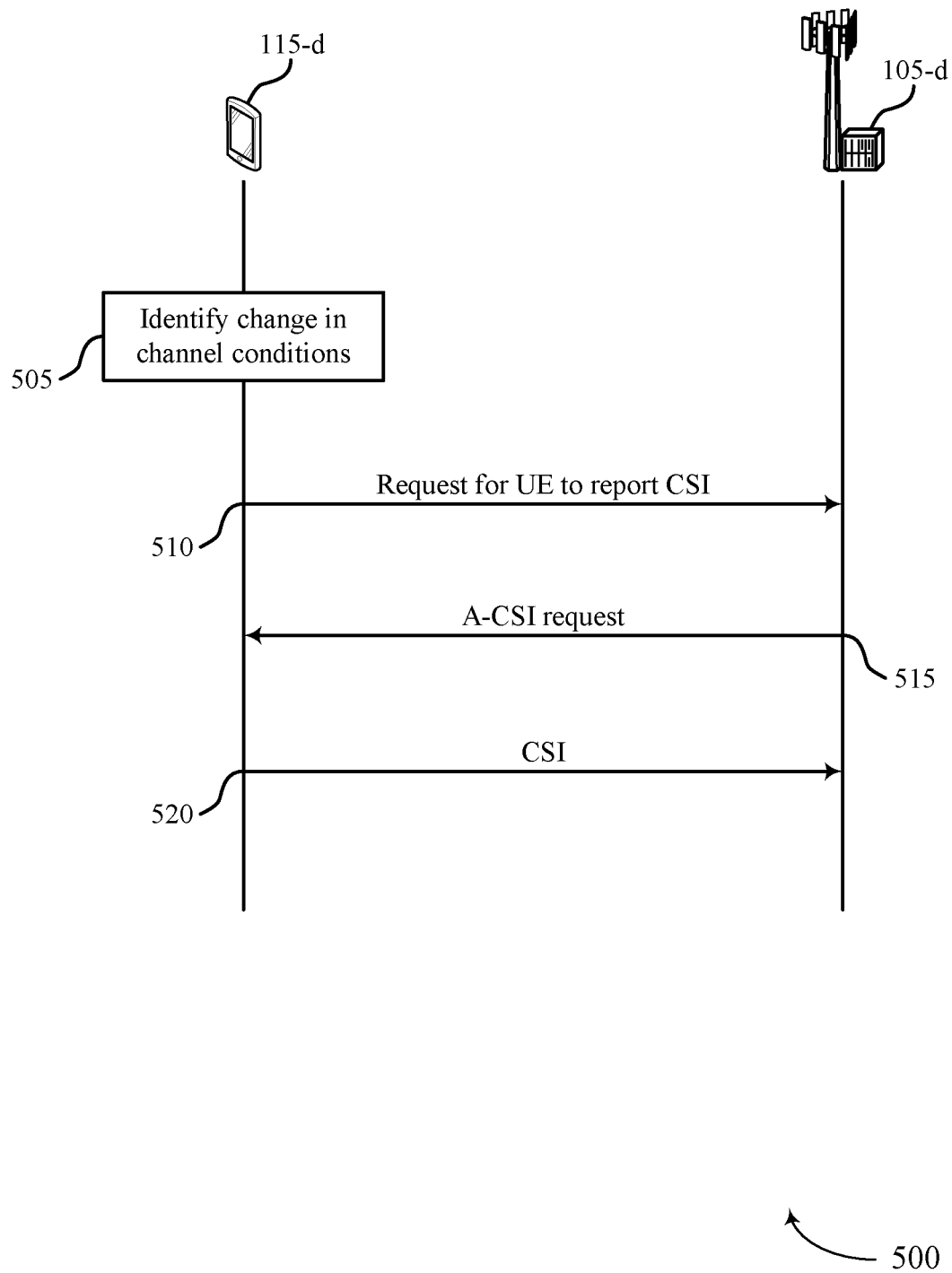
FIG. 5 illustrates an example of a process flow that supports CSI triggering for uplink dominant traffic in accordance with aspects of the present disclosure.

FIG. 5 illustrates an example of a process flow 500 that supports CSI triggering for uplink dominant traffic in accordance with aspects of the present disclosure. The process flow 500 illustrates aspects of techniques performed by a UE 115-d, which may be an example of a UE 115 described with reference to FIGS. 1-4. The process flow 500 also illustrates aspects of techniques performed by a base station 105-d, which may be an example of a base station 105 described with reference to FIGS. 1-4. As described herein, UE 115-d in process flow 500 may support efficient techniques for reporting CSI to the base station 105-d with limited overhead for uplink dominant traffic.

At 505, the UE 115-d may identify a change of downlink channel conditions based on one or more downlink transmissions received from the base station 105-d. For instance, the UE 115-d may determine that a CQI or PMI associated with the downlink channel conditions is different from a previously reported CQI or PMI. At 510, UE 115-d may then transmit, and the base station 105-d may receive, a request for the UE 115-d to report CSI to the base station 105-d (e.g., a one-bit CSI update request) based on identifying the change of downlink channel conditions. In some cases, the UE 115-d may transmit the request in a MAC-CE of a CG-PUSCH or in a dedicated control channel. The base station 105-d may determine that previous CSI received from the UE 115-d is invalid based on receiving the request for the UE 115-d to report the CSI to the base station 105-d. At 515, the base station 105-d may transmit, and the UE 115-d may receive, an indication that the UE 115-d is to report the CSI to the base station 105-b based on the request at 510. At 520, UE 115-d may then report the CSI to the base station 105-d.

Figure 6:
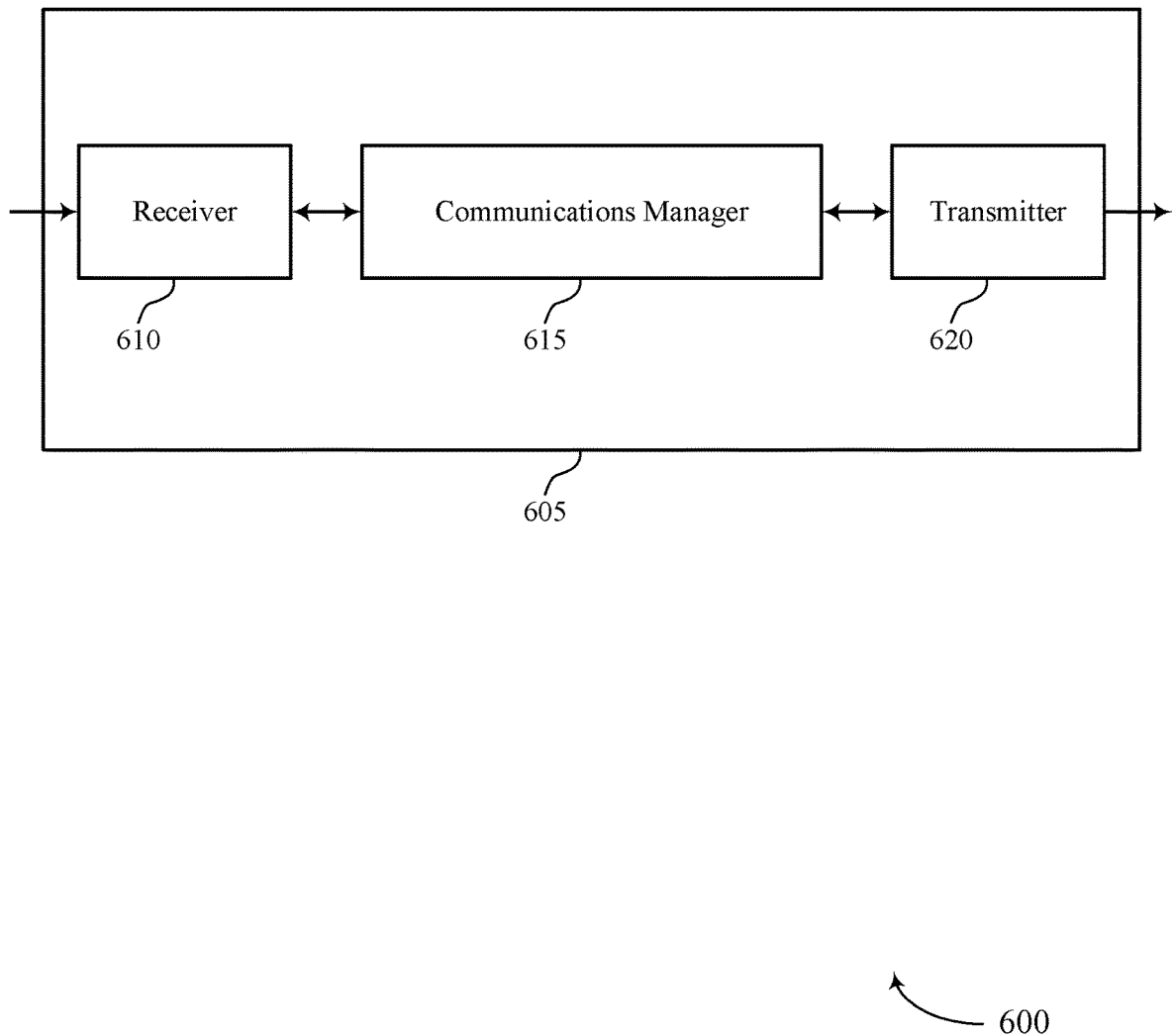
FIGS. 6 and 7 show block diagrams of devices that support CSI triggering for uplink dominant traffic in accordance with aspects of the present disclosure.

FIG. 6 shows a block diagram 600 of a device 605 that supports CSI triggering for uplink dominant traffic in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to CSI triggering for uplink dominant traffic, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify that the UE is configured for transmitting a channel state information report to a base station on a configured grant uplink data channel. The communications manager 615 may identify a first opportunity for transmitting data and the channel state information report on the configured grant uplink data channel. The communications manager 615 may determine whether the UE has data to transmit during the first opportunity on the configured grant uplink data channel. The communications manager 615 may transmit data and the channel state information report on the configured grant uplink data channel during the first opportunity if the UE has data to transmit during the first opportunity, and the communications manager 615 may suppress transmission of the channel state information report on the configured grant uplink data channel during the first opportunity if the UE does not have data to transmit during the first opportunity.

The communications manager 615 may also identify a change of downlink channel conditions based on one or more downlink transmissions received from a base station. The communications manager 615 may transmit a request for the UE to report channel state information to the base station based on the identifying. The communications manager 615 may receive an indication that the UE is to report the channel state information to the base station based on transmitting the request. The communications manager 615 may report the channel state information to the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
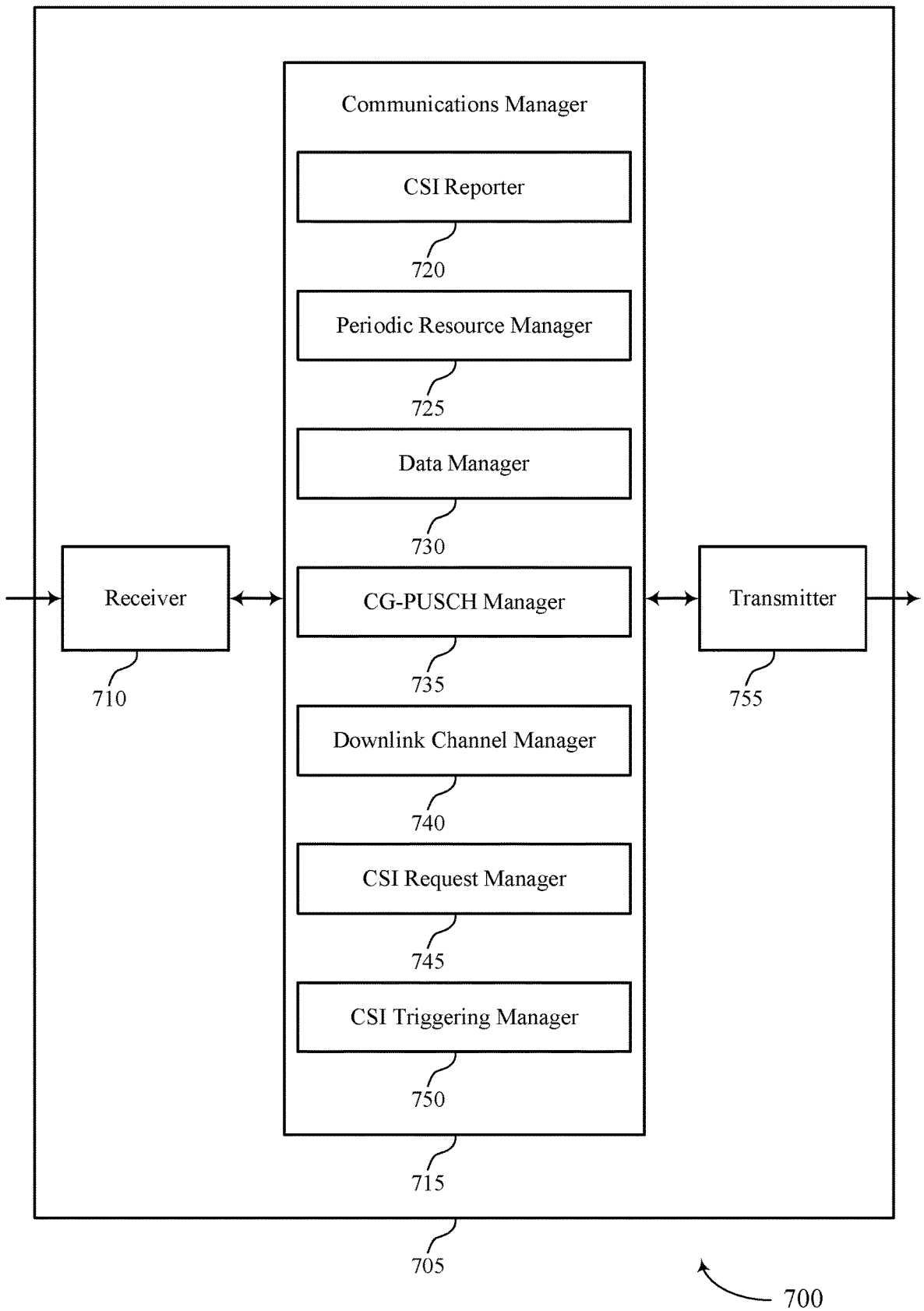

FIG. 7 shows a block diagram 700 of a device 705 that supports CSI triggering for uplink dominant traffic in accordance with aspects of the present disclosure. The device 705 may be an example of aspects of a device 605, or a UE 115 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to CSI triggering for uplink dominant traffic, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CSI reporter 720, a periodic resource manager 725, a data manager 730, a CG-PUSCH manager 735, a downlink channel manager 740, a CSI request manager 745, and a CSI triggering manager 750. The communications manager 715 may be an example of aspects of the communications manager 910 described herein.

The CSI reporter 720 may identify that the UE is configured for transmitting a channel state information report to a base station on a configured grant uplink data channel. The periodic resource manager 725 may identify a first opportunity for transmitting data and the channel state information report on the configured grant uplink data channel. The data manager 730 may determine whether the UE has data to transmit during the first opportunity on the configured grant uplink data channel. The CG-PUSCH manager 735 may transmit data and the channel state information report on the configured grant uplink data channel during the first opportunity if the UE has data to transmit during the first opportunity and suppress transmission of the channel state information report on the configured grant uplink data channel during the first opportunity if the UE does not have data to transmit during the first opportunity.

The downlink channel manager 740 may identify a change of downlink channel conditions based on one or more downlink transmissions received from a base station. The CSI request manager 745 may transmit a request for the UE to report channel state information to the base station based on the identifying. The CSI triggering manager 750 may receive an indication that the UE is to report the channel state information to the base station based on transmitting the request. The CSI reporter 720 may report the channel state information to the base station.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
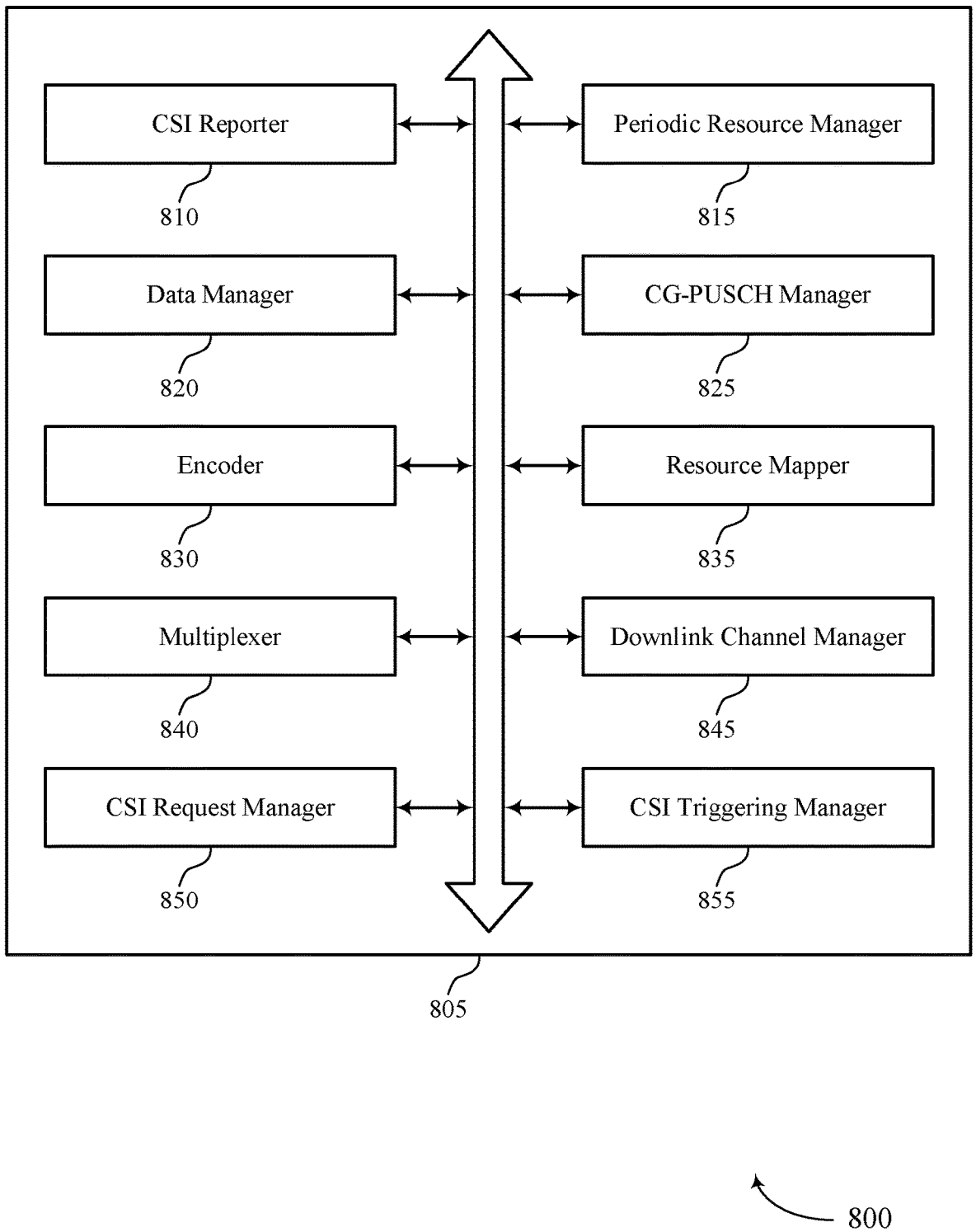
FIG. 8 shows a block diagram of a communications manager that supports CSI triggering for uplink dominant traffic in accordance with aspects of the present disclosure.

FIG. 8 shows a block diagram 800 of a communications manager 805 that supports CSI triggering for uplink dominant traffic in accordance with aspects of the present disclosure. The communications manager 805 may be an example of aspects of a communications manager 615, a communications manager 715, or a communications manager 910 described herein. The communications manager 805 may include a CSI reporter 810, a periodic resource manager 815, a data manager 820, a CG-PUSCH manager 825, an encoder 830, a resource mapper 835, a multiplexer 840, a downlink channel manager 845, a CSI request manager 850, and a CSI triggering manager 855. Each of these modules may communicate, directly or indirectly, with one another (e.g., via one or more buses).

The CSI reporter 810 may identify that the UE is configured for transmitting a channel state information report to a base station on a configured grant uplink data channel. The periodic resource manager 815 may identify a first opportunity for transmitting data and the channel state information report on the configured grant uplink data channel. The data manager 820 may determine whether the UE has data to transmit during the first opportunity on the configured grant uplink data channel. The CG-PUSCH manager 825 may transmit data and the channel state information report on the configured grant uplink data channel during the first opportunity if the UE has data to transmit during the first opportunity. In some examples, the CG-PUSCH manager 825 may suppress transmission of the channel state information report on the configured grant uplink data channel during the first opportunity if the UE does not have data to transmit during the first opportunity.

In some examples, the CG-PUSCH manager 825 may suppress transmitting the channel state information report on any physical channel during the first opportunity. In some examples, the data manager 820 may determine, subsequent to suppressing transmission of the channel state information report during the first opportunity on the configured grant uplink data channel, that the UE has data to transmit during a second opportunity on the configured grant uplink data channel. In some examples, the CG-PUSCH manager 825 may transmit the data and the channel state information report in the second opportunity on the configured grant uplink data channel based on determining that the UE has data to transmit during the second opportunity.

In some examples, the periodic resource manager 815 may receive a configuration of a first periodicity for transmitting channel state information reports to the base station and a second periodicity for transmitting data to the base station, where the first periodicity is an integer multiple of the second periodicity. In some examples, the periodic resource manager 815 may receive a configuration of a first periodicity for transmitting channel state information reports to the base station, where the configuration indicates an index of the configured grant uplink data channel linked to the channel state information reports and associated with a second periodicity for transmitting data to the base station, where the first periodicity is an integer multiple of the second periodicity.

The encoder 830 may encode the data and the channel state information report using different encoding schemes. The resource mapper 835 may map the data and the channel state information report to different resource elements. The multiplexer 840 may multiplex the data and the channel state information report in the first opportunity on the configured grant uplink data channel. In some examples, the CSI reporter 810 may transmit the channel state information report in a MAC-CE during the first opportunity on the configured grant uplink data channel. In some examples, the CSI reporter 810 may determine a channel quality indicator to include in the channel state information report based on a previous precoding matrix indicator reported in aperiodic channel state information feedback or a precoder matrix cycling over a codebook subset. In some examples, the CSI reporter 810 may transmit, in the MAC-CE, an indication of whether the channel quality indicator is based on the previous precoding matrix indicator reported in the aperiodic channel state information feedback or the precoder matrix cycling over the codebook subset.

The downlink channel manager 845 may identify a change of downlink channel conditions based on one or more downlink transmissions received from a base station. The CSI request manager 850 may transmit a request for the UE to report channel state information to the base station based on the identifying. The CSI triggering manager 855 may receive an indication that the UE is to report the channel state information to the base station based on transmitting the request. In some examples, the CSI reporter 810 may report the channel state information to the base station. In some examples, the downlink channel manager 845 may determine that a channel quality indicator or precoding matrix indicator associated with the downlink channel conditions is different from a previously reported channel quality indicator or precoding matrix indicator. In some examples, the CSI reporter 810 may transmit the request in a MAC-CE of a configured grant uplink data channel or in a dedicated control channel. In some cases, the request for the UE to report the channel state information includes a one-bit channel state information update request.

Figure 9:
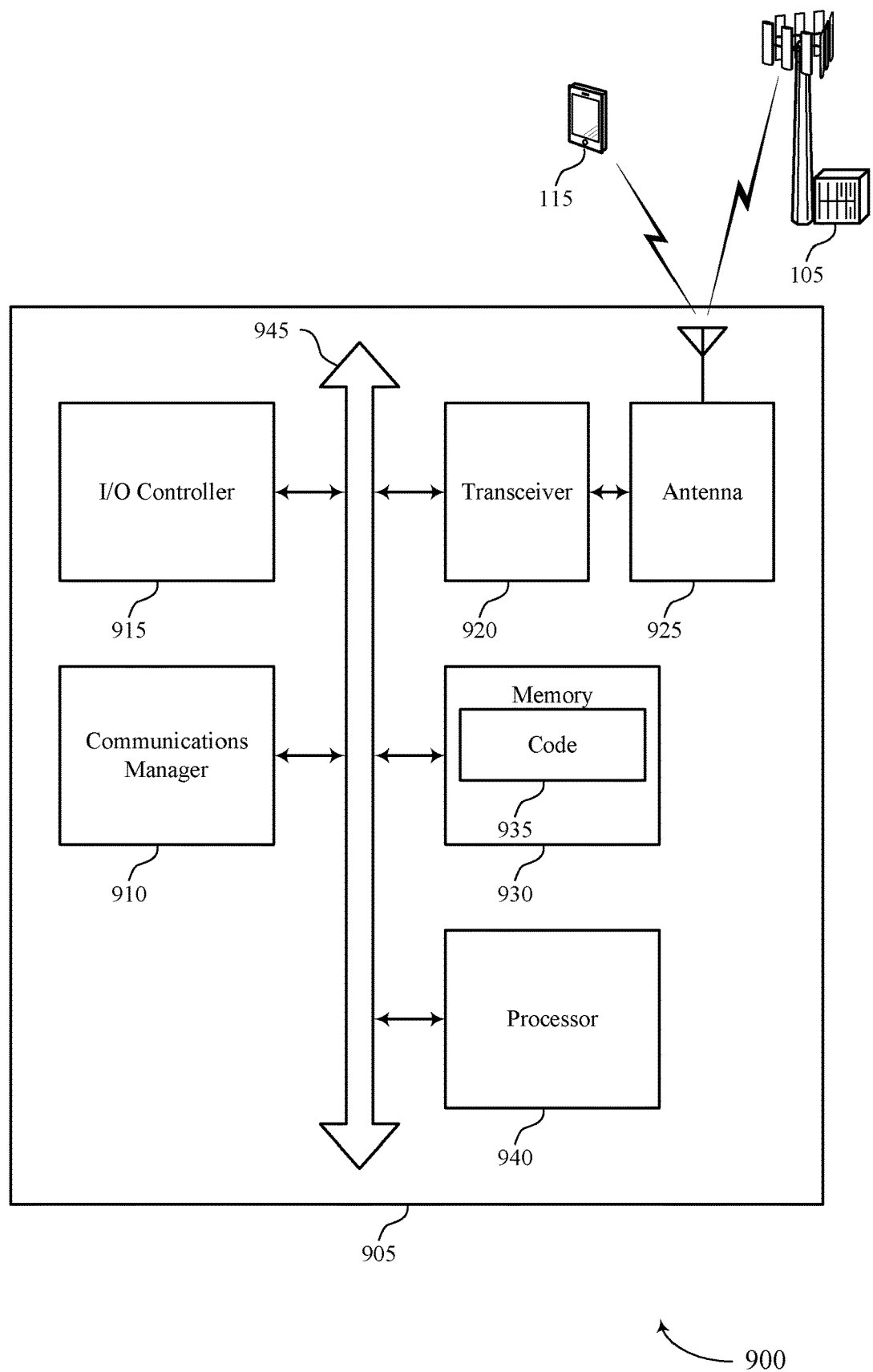
FIG. 9 shows a diagram of a system including a device that supports CSI triggering for uplink dominant traffic in accordance with aspects of the present disclosure.

FIG. 9 shows a diagram of a system 900 including a device 905 that supports CSI triggering for uplink dominant traffic in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify that the UE is configured for transmitting a channel state information report to a base station on a configured grant uplink data channel. The communications manager 910 may identify a first opportunity for transmitting data and the channel state information report on the configured grant uplink data channel. The communications manager 910 may determine whether the UE has data to transmit during the first opportunity on the configured grant uplink data channel. The communications manager 910 may transmit data and the channel state information report on the configured grant uplink data channel during the first opportunity if the UE has data to transmit during the first opportunity, and the communications manager 910 may suppress transmission of the channel state information report on the configured grant uplink data channel during the first opportunity if the UE does not have data to transmit during the first opportunity.

The communications manager 910 may also identify a change of downlink channel conditions based on one or more downlink transmissions received from a base station. The communications manager 910 may transmit a request for the UE to report channel state information to the base station based on the identifying. The communications manager 910 may receive an indication that the UE is to report the channel state information to the base station based on transmitting the request. The communications manager 910 may report the channel state information to the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting CSI triggering for uplink dominant traffic).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
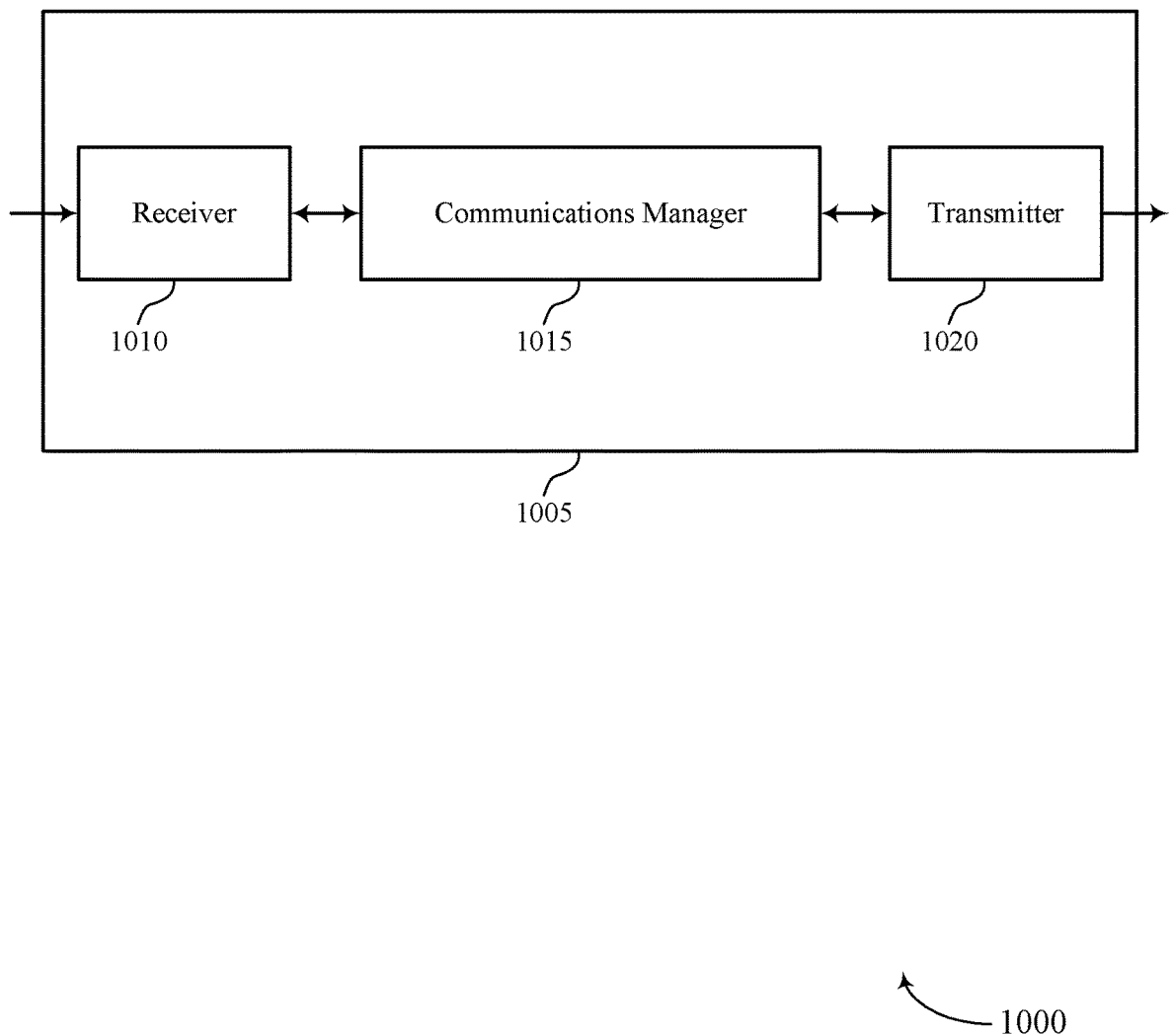
FIGS. 10 and 11 show block diagrams of devices that support CSI triggering for uplink dominant traffic in accordance with aspects of the present disclosure.

FIG. 10 shows a block diagram 1000 of a device 1005 that supports CSI triggering for uplink dominant traffic in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI triggering for uplink dominant traffic, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, a request for the UE to report channel state information to the base station. The communications manager 1015 may transmit an indication that the UE is to report the channel state information to the base station based on receiving the request. The communications manager 1015 may receive the channel state information from the UE based on transmitting the indication. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
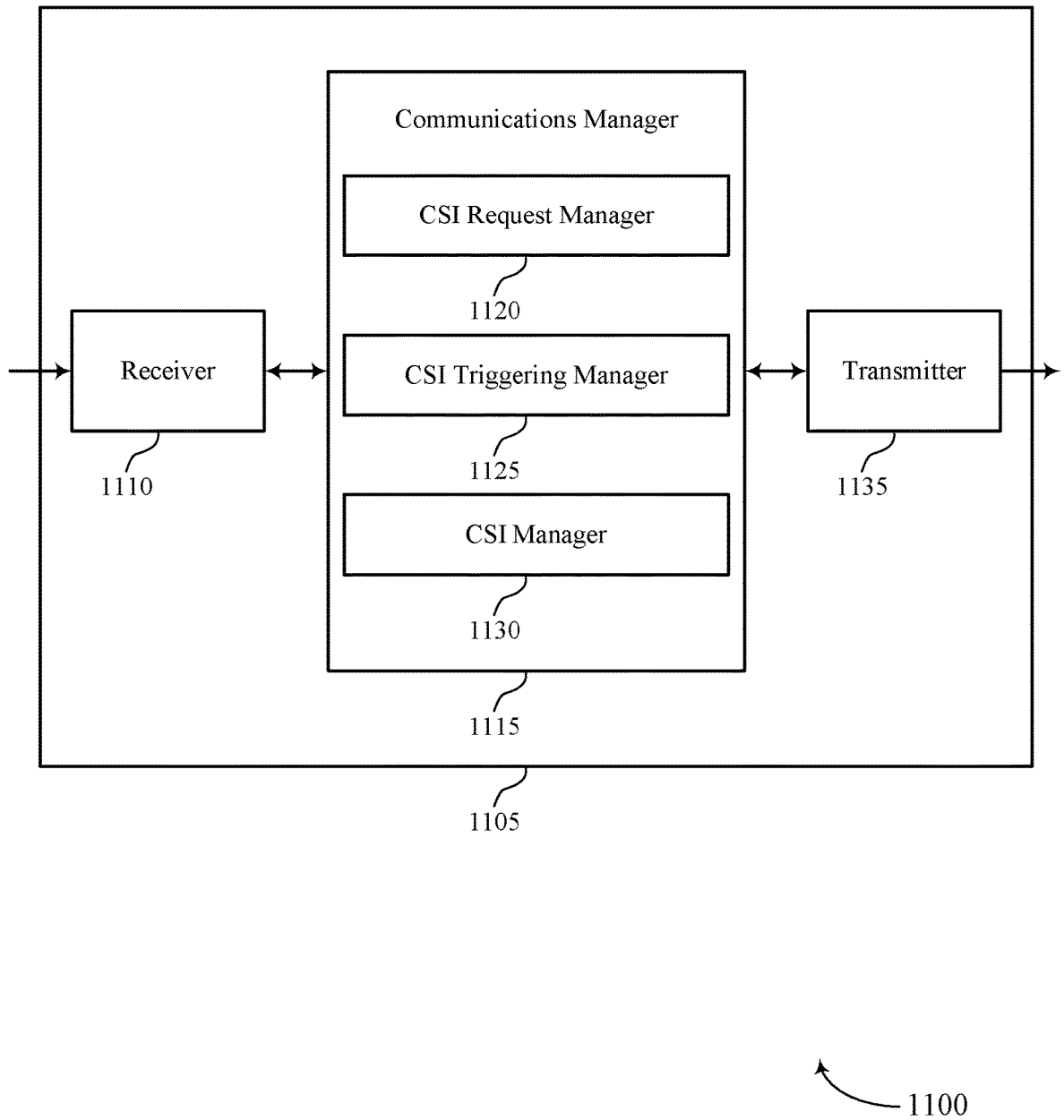

FIG. 11 shows a block diagram 1100 of a device 1105 that supports CSI triggering for uplink dominant traffic in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to CSI triggering for uplink dominant traffic, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CSI request manager 1120, a CSI triggering manager 1125, and a CSI manager 1130. The communications manager 1115 may be an example of aspects of the communications manager 1310 described herein.

The CSI request manager 1120 may receive, from a UE, a request for the UE to report channel state information to the base station. The CSI triggering manager 1125 may transmit an indication that the UE is to report the channel state information to the base station based on receiving the request. The CSI manager 1130 may receive the channel state information from the UE based on transmitting the indication.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
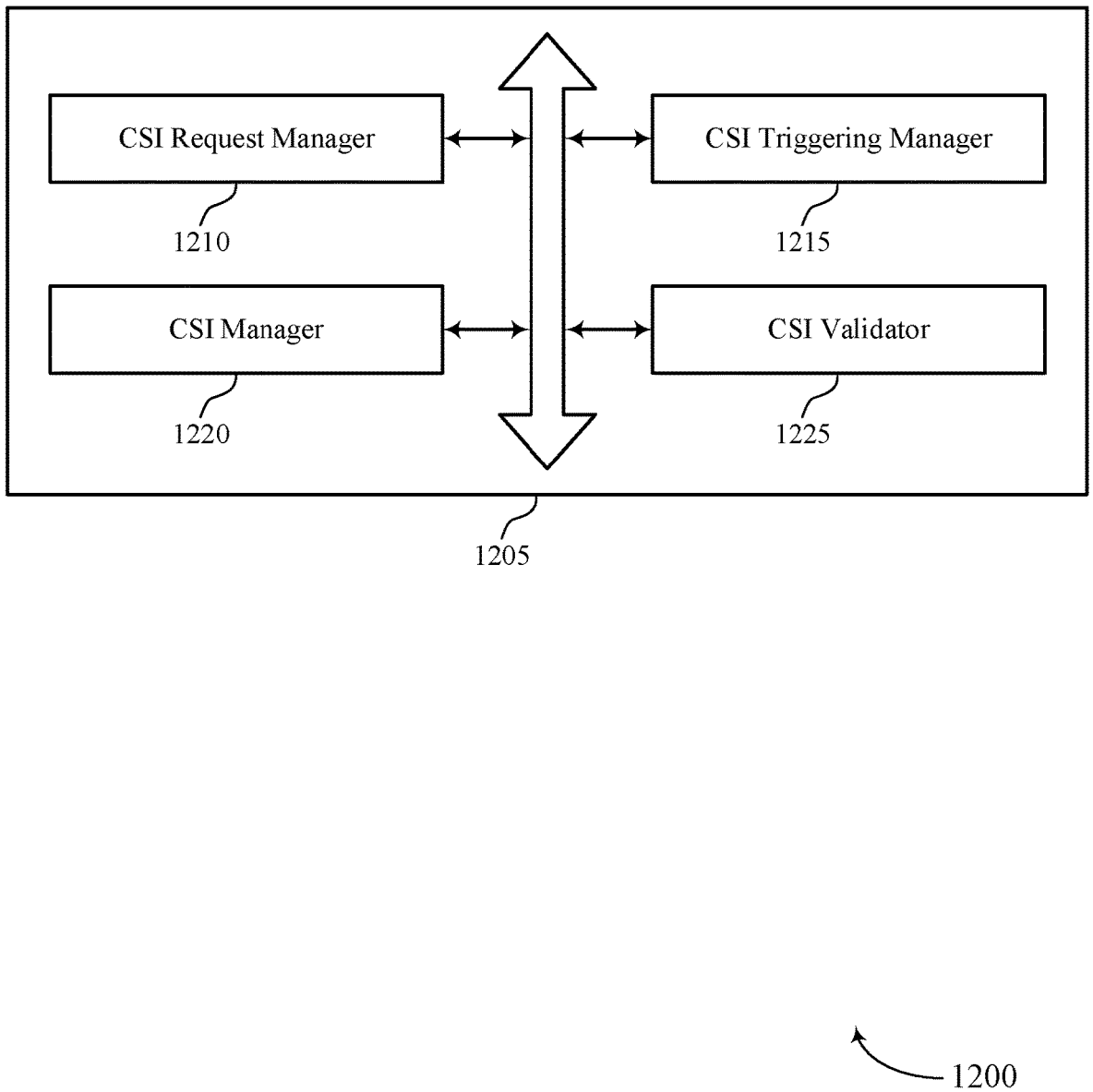
FIG. 12 shows a block diagram of a communications manager that supports CSI triggering for uplink dominant traffic in accordance with aspects of the present disclosure.

FIG. 12 shows a block diagram 1200 of a communications manager 1205 that supports CSI triggering for uplink dominant traffic in accordance with aspects of the present disclosure. The communications manager 1205 may be an example of aspects of a communications manager 1015, a communications manager 1115, or a communications manager 1310 described herein. The communications manager 1205 may include a CSI request manager 1210, a CSI triggering manager 1215, a CSI manager 1220, and a CSI validator 1225. Each of these modules may communicate, directly or indirectly, with one another (e.g., via one or more buses).

The CSI request manager 1210 may receive, from a UE, a request for the UE to report channel state information to the base station. The CSI triggering manager 1215 may transmit an indication that the UE is to report the channel state information to the base station based on receiving the request. The CSI manager 1220 may receive the channel state information from the UE based on transmitting the indication. The CSI validator 1225 may determine that previous channel state information received from the UE is invalid based on receiving the request for the UE to report the channel state information to the base station. In some examples, the CSI request manager 1210 may receive the request in a MAC-CE of a configured grant uplink data channel or in a dedicated control channel. In some cases, the request for the UE to report the channel state information includes a one-bit channel state information update request.

Figure 13:
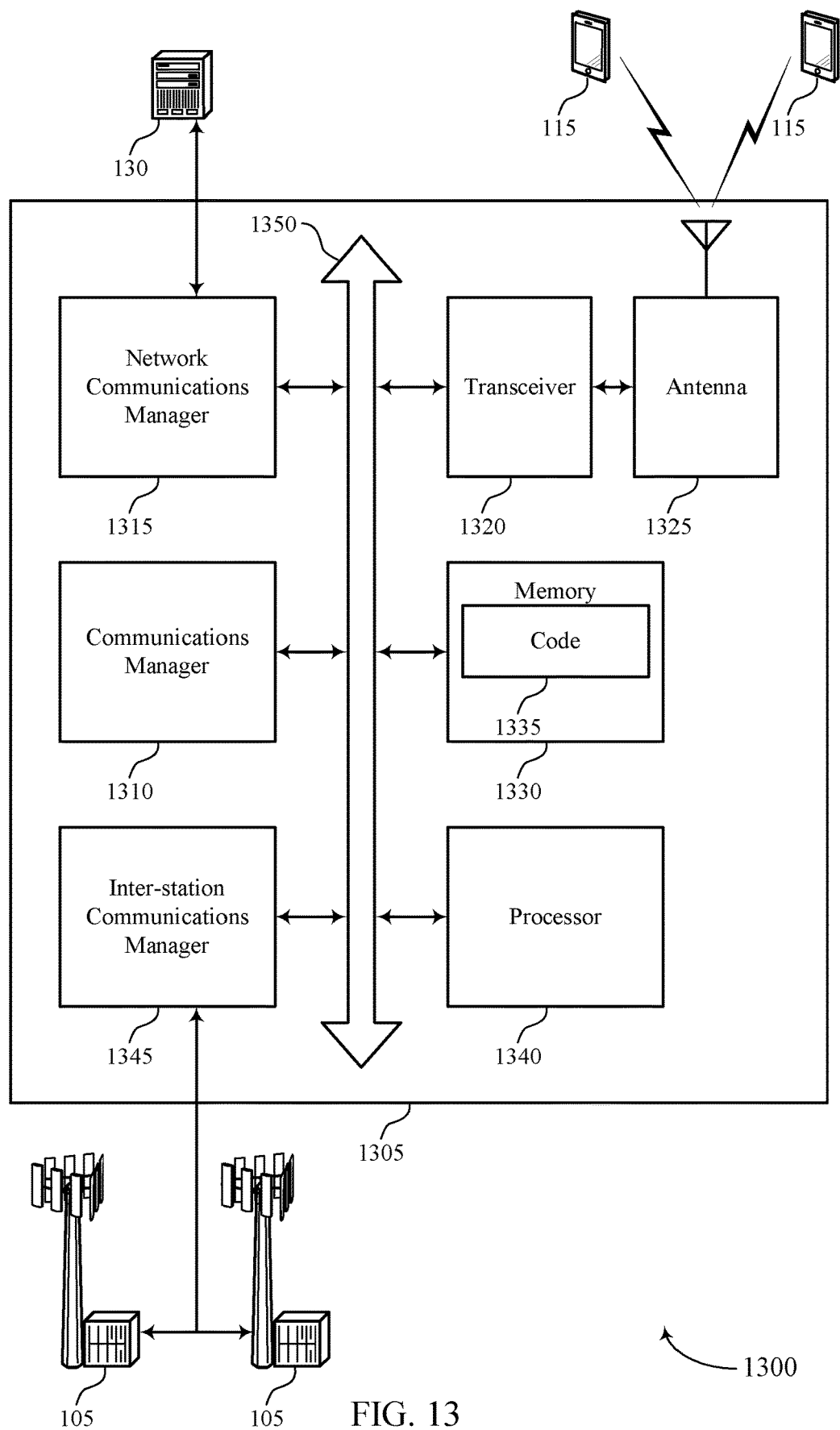
FIG. 13 shows a diagram of a system including a device that supports CSI triggering for uplink dominant traffic in accordance with aspects of the present disclosure.

FIG. 13 shows a diagram of a system 1300 including a device 1305 that supports CSI triggering for uplink dominant traffic in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, a request for the UE to report channel state information to the base station. The communications manager 1310 may transmit an indication that the UE is to report the channel state information to the base station based on receiving the request. The communications manager 1310 may receive the channel state information from the UE based on transmitting the indication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting CSI triggering for uplink dominant traffic).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
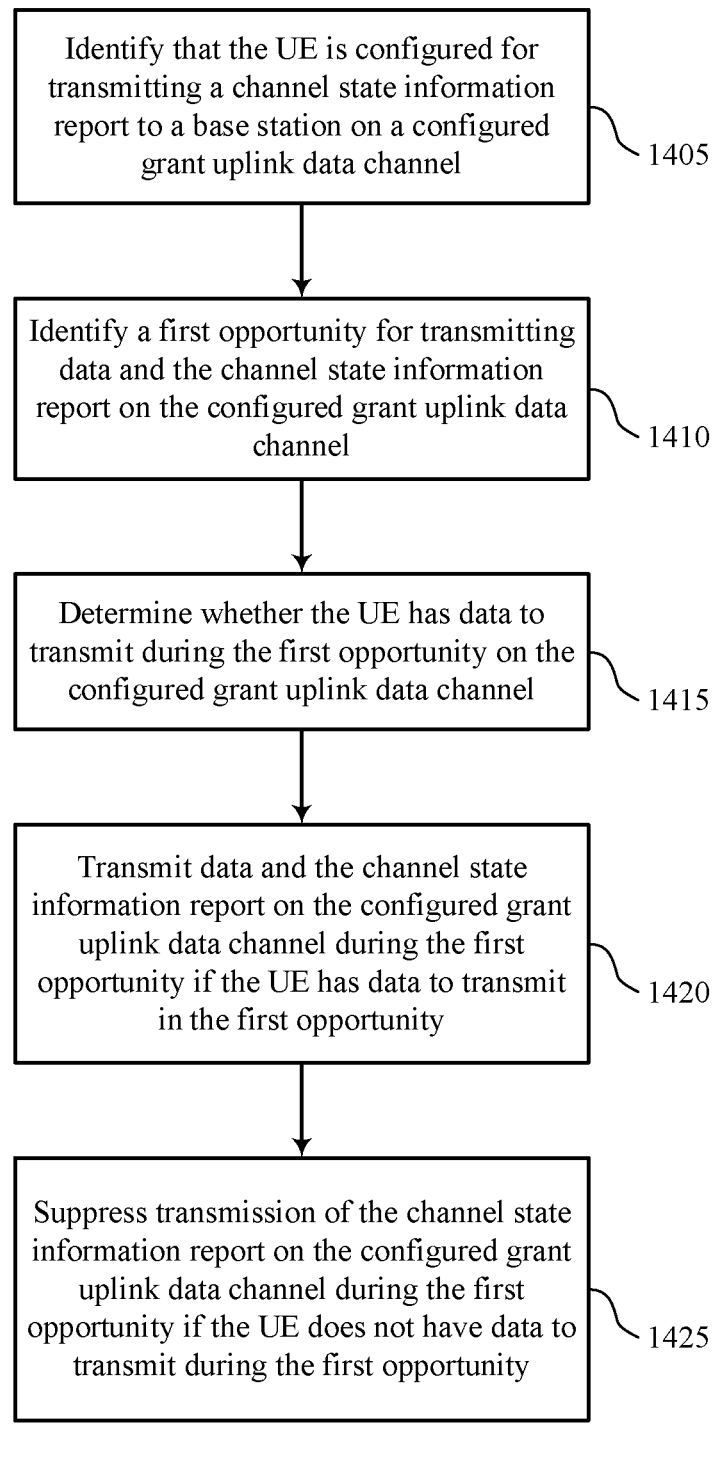
FIGS. 14 through 16 show flowcharts illustrating methods that support CSI triggering for uplink dominant traffic in accordance with aspects of the present disclosure.

FIG. 14 shows a flowchart illustrating a method 1400 that supports CSI triggering for uplink dominant traffic in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may identify that the UE is configured for transmitting a channel state information report to a base station on a configured grant uplink data channel. The operations of 1405 may be performed according to the methods described herein. In some examples, aspects of the operations of 1405 may be performed by a CSI reporter as described with reference to FIGS. 6 through 9.

At 1410, the UE may identify a first opportunity for transmitting data and the channel state information report on the configured grant uplink data channel. The operations of 1410 may be performed according to the methods described herein. In some examples, aspects of the operations of 1410 may be performed by a periodic resource manager as described with reference to FIGS. 6 through 9.

At 1415, the UE may determine whether the UE has data to transmit during the first opportunity on the configured grant uplink data channel. The operations of 1415 may be performed according to the methods described herein. In some examples, aspects of the operations of 1415 may be performed by a data manager as described with reference to FIGS. 6 through 9.

At 1420, the UE may transmit data and the channel state information report on the configured grant uplink data channel during the first opportunity if the UE has data to transmit during the first opportunity. The operations of 1420 may be performed according to the methods described herein. In some examples, aspects of the operations of 1420 may be performed by a CG-PUSCH manager as described with reference to FIGS. 6 through 9.

At 1425, the UE may suppress transmission of the channel state information report on the configured grant uplink data channel during the first opportunity if the UE does not have data to transmit during the first opportunity. The operations of 1425 may be performed according to the methods described herein. In some examples, aspects of the operations of 1425 may be performed by a CG-PUSCH manager as described with reference to FIGS. 6 through 9.

Figure 15:
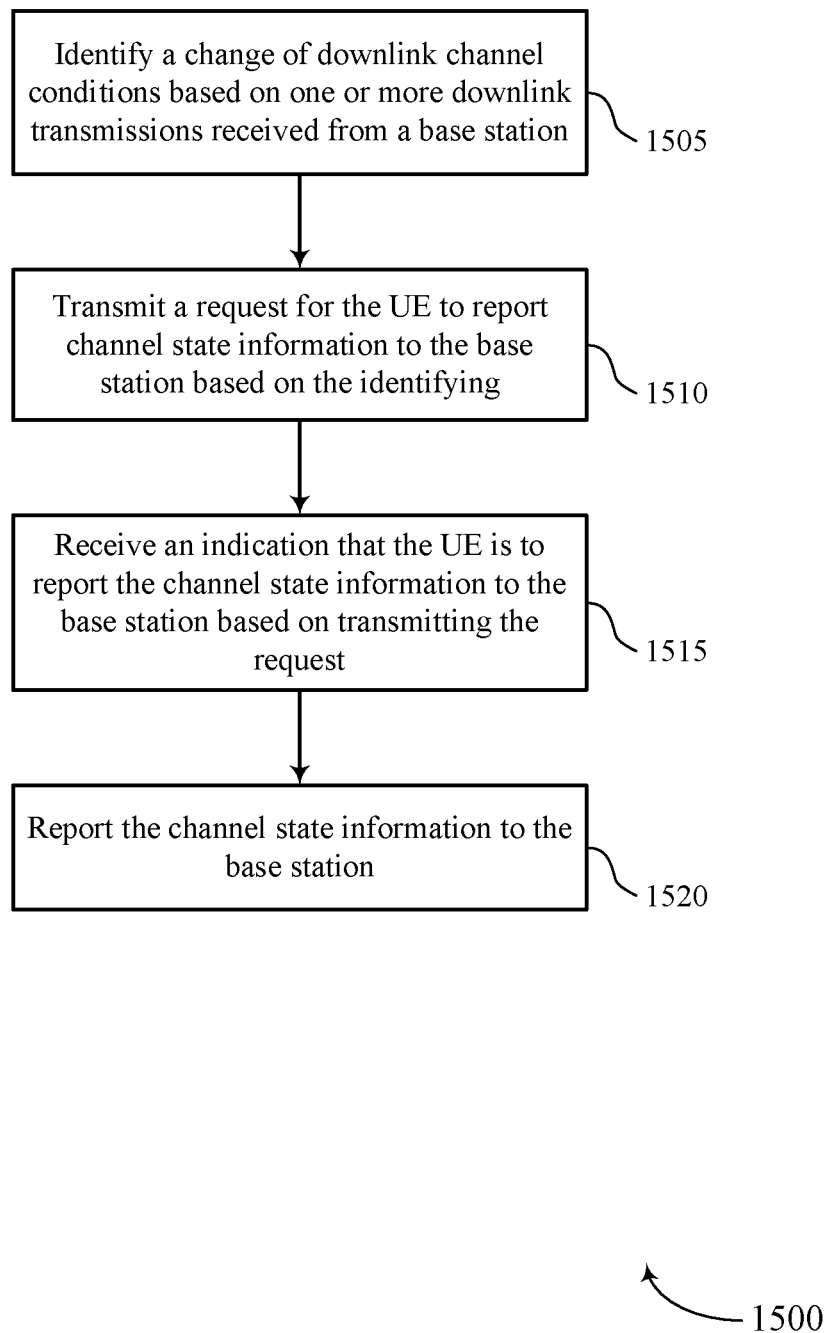

FIG. 15 shows a flowchart illustrating a method 1500 that supports CSI triggering for uplink dominant traffic in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may identify a change of downlink channel conditions based on one or more downlink transmissions received from a base station. The operations of 1505 may be performed according to the methods described herein. In some examples, aspects of the operations of 1505 may be performed by a downlink channel manager as described with reference to FIGS. 6 through 9.

At 1510, the UE may transmit a request for the UE to report channel state information to the base station based on the identifying. The operations of 1510 may be performed according to the methods described herein. In some examples, aspects of the operations of 1510 may be performed by a CSI request manager as described with reference to FIGS. 6 through 9.

At 1515, the UE may receive an indication that the UE is to report the channel state information to the base station based on transmitting the request. The operations of 1515 may be performed according to the methods described herein. In some examples, aspects of the operations of 1515 may be performed by a CSI triggering manager as described with reference to FIGS. 6 through 9.

At 1520, the UE may report the channel state information to the base station. The operations of 1520 may be performed according to the methods described herein. In some examples, aspects of the operations of 1520 may be performed by a CSI reporter as described with reference to FIGS. 6 through 9.

Figure 16:
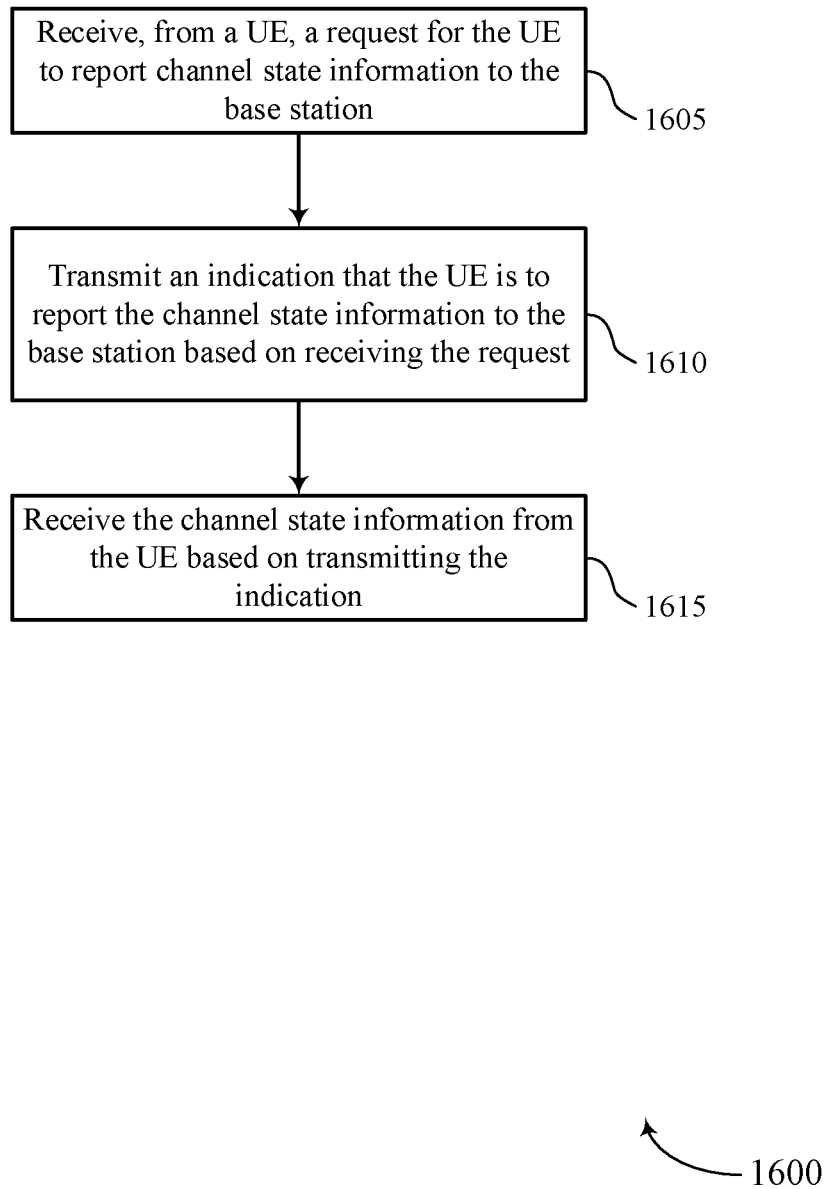

FIG. 16 shows a flowchart illustrating a method 1600 that supports CSI triggering for uplink dominant traffic in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1605, the base station may receive, from a UE, a request for the UE to report channel state information to the base station. The operations of 1605 may be performed according to the methods described herein. In some examples, aspects of the operations of 1605 may be performed by a CSI request manager as described with reference to FIGS. 10 through 13.

At 1610, the base station may transmit an indication that the UE is to report the channel state information to the base station based on receiving the request. The operations of 1610 may be performed according to the methods described herein. In some examples, aspects of the operations of 1610 may be performed by a CSI triggering manager as described with reference to FIGS. 10 through 13.

At 1615, the base station may receive the channel state information from the UE based on transmitting the indication. The operations of 1615 may be performed according to the methods described herein. In some examples, aspects of the operations of 1615 may be performed by a CSI manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2"(3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is configured for transmitting a channel state information report to a base station on a configured grant uplink data channel;

identifying a first opportunity for transmitting data and the channel state information report on the configured grant uplink data channel;

determining whether the UE has the data to transmit during the first opportunity;

transmitting the data and the channel state information report on the configured grant uplink data channel during the first opportunity in response to the UE having the data to transmit during the first opportunity; and suppressing transmission of the channel state information report during the first opportunity on the configured grant uplink data channel in response to the UE not having the data to transmit during the first opportunity; and receiving a configuration of a first periodicity for transmitting channel state information reports to the base station and a second periodicity for transmitting the data to the base station, wherein the first periodicity is an integer multiple of the second periodicity.

2. The method of claim 1, wherein suppressing the transmission of the channel state information report during the first opportunity comprises:

suppressing transmitting the channel state information report on any physical channel during the first opportunity.

3. The method of claim 1, further comprising:

determining, subsequent to suppressing the transmission of the channel state information report during the first opportunity on the configured grant uplink data channel, that the UE has the data to transmit during a second opportunity on the configured grant uplink data channel; and transmitting the data and the channel state information report during the second opportunity on the configured grant uplink data channel based at least in part on determining that the UE has the data to transmit during the second opportunity.

4. The method of claim 1, wherein transmitting the data and the channel state information report during the first opportunity on the configured grant uplink data channel comprises:

encoding the data and the channel state information report using different encoding schemes;

mapping the data and the channel state information report to different resource elements; and multiplexing the data and the channel state information report during the first opportunity on the configured grant uplink data channel.

5. A method for wireless communication at a user equipment (UE), comprising:

identifying that the UE is configured for transmitting a channel state information report to a base station on a configured grant uplink data channel;

identifying a first opportunity for transmitting data and the channel state information report on the configured grant uplink data channel;

determining whether the UE has the data to transmit during the first opportunity;

transmitting the data and the channel state information report on the configured grant uplink data channel during the first opportunity in response to the UE having the data to transmit during the first opportunity;

suppressing transmission of the channel state information report during the first opportunity on the configured grant uplink data channel in response to the UE not having the data to transmit during the first opportunity; and receiving a configuration of a first periodicity for transmitting channel state information reports to the base station, wherein the configuration indicates an index of the configured grant uplink data channel linked to the channel state information reports and associated with a second periodicity for transmitting the data to the base station, wherein the first periodicity is an integer multiple of the second periodicity.

6. A method for wireless communication at a user equipment (UE), comprising:

identifying that the UE is configured for transmitting a channel state information report to a base station on a configured grant uplink data channel;

identifying a first opportunity for transmitting data and the channel state information report on the configured grant uplink data channel;

determining whether the UE has the data to transmit during the first opportunity;

transmitting the data and the channel state information report on the configured grant uplink data channel during the first opportunity in response to the UE having the data to transmit during the first opportunity, wherein transmitting the channel state information report during the first opportunity on the configured grant uplink data channel comprises: transmitting the channel state information report in a medium access control (MAC) control element (MAC-CE) during the first opportunity on the configured grant uplink data channel, and wherein the channel state information report is transmitted without a precoding matrix indicator; and determining a channel quality indicator to include in the channel state information report based at least in part on a previous precoding matrix indicator reported in aperiodic channel state information feedback or a precoder matrix cycling over a codebook subset.

7. The method of claim 6, further comprising:

transmitting, in the medium access control (MAC) control element (MAC-CE), an indication of whether the channel quality indicator is based at least in part on the previous precoding matrix indicator reported in the aperiodic channel state information feedback or the precoder matrix cycling over the codebook subset.

8. A method for wireless communication at a user equipment (UE), comprising:

identifying a change of downlink channel conditions based at least in part on one or more downlink transmissions received from a base station;

transmitting a request for the UE to report channel state information to the base station based at least in part on the identifying;

receiving an indication that the UE is to report the channel state information to the base station based at least in part on transmitting the request; and reporting the channel state information to the base station;

wherein transmitting the request for reporting the channel state information comprises:

transmitting the request in a medium access control (MAC) control element (MAC-CE) of a configured grant uplink data channel or in a dedicated control channel.

9. The method of claim 8, wherein identifying the change of downlink channel conditions comprises:

determining that a channel quality indicator or precoding matrix indicator associated with the downlink channel conditions is different from a previously reported channel quality indicator or precoding matrix indicator.

10. A method for wireless communication at a user equipment (UE), comprising:
identifying a change of downlink channel conditions based at least in part on one or more downlink transmissions received from a base station;
transmitting a request for the UE to report channel state information to the base station based at least in part on the identifying, wherein the request for the UE to report the channel state information comprises a one-bit channel state information update request; and
receiving an indication that the UE is to report the channel state information to the base station based at least in part on transmitting the request; and reporting the channel state information to the base station.

11. A method for wireless communication at a base station, comprising:
receiving, from a user equipment (UE), a request for the UE to report channel state information to the base station;
transmitting an indication that the UE is to report the channel state information to the base station based at least in part on receiving the request; and
receiving the channel state information from the UE based at least in part on transmitting the indication;
wherein receiving the request for the UE to report the channel state information comprises:
receiving the request in a medium access control (MAC) control element (MAC-CE) of a configured grant uplink data channel or in a dedicated control channel.

12. The method of claim 11, further comprising:
determining that previous channel state information received from the UE is invalid based at least in part on receiving the request for the UE to report the channel state information to the base station.

13. A method for wireless communication at a base station, comprising:
receiving, from a user equipment (UE), a request for the UE to report channel state information to the base station, wherein the request for the UE to report the channel state information comprises a one-bit channel state information update request;
transmitting an indication that the UE is to report the channel state information to the base station based at least in part on receiving the request; and
receiving the channel state information from the UE based at least in part on transmitting the indication.

14. An apparatus for wireless communication at a user equipment (UE), comprising:
a processor,
memory coupled with the processor; and
instructions stored in the memory and executable by the processor to cause the apparatus to:
identify that the UE is configured for transmitting a channel state information report to a base station on a configured grant uplink data channel;
identify a first opportunity for transmitting data and the channel state information report on the configured grant uplink data channel;
determine whether the UE has the data to transmit during the first opportunity;
transmit the data and the channel state information report on the configured grant uplink data channel during the first opportunity in response to the UE having the data to transmit during the first opportunity;
suppress transmission of the channel state information report during the first opportunity on the configured grant uplink data channel in response to the UE not having the data to transmit during the first opportunity; and
receive a configuration of a first periodicity for transmitting channel state information reports to the base station and a second periodicity for transmitting the data to the base station, wherein the first periodicity is an integer multiple of the second periodicity.

15. The apparatus of claim 14, wherein the instructions to suppress the transmission of the channel state information report during the first opportunity are executable by the processor to cause the apparatus to:
suppress transmitting the channel state information report on any physical channel during the first opportunity.

16. The apparatus of claim 14, wherein the instructions are further executable by the processor to cause the apparatus to:
determine, subsequent to suppressing the transmission of the channel state information report during the first opportunity on the configured grant uplink data channel, that the UE has the data to transmit during a second opportunity on the configured grant uplink data channel; and
transmit the data and the channel state information report during the second opportunity on the configured grant uplink data channel based at least in part on determining that the UE has the data to transmit during the second opportunity.

17. An apparatus for wireless communication at a user equipment (UE), comprising:
a processor,
memory coupled with the processor; and
instructions stored in the memory and executable by the processor to cause the apparatus to:
identify that the UE is configured for transmitting a channel state information report to a base station on a configured grant uplink data channel;
identify a first opportunity for transmitting data and the channel state information report on the configured grant uplink data channel;
determine whether the UE has the data to transmit during the first opportunity;
transmit the data and the channel state information report on the configured grant uplink data channel during the first opportunity in response to the UE having the data to transmit during the first opportunity;
suppress transmission of the channel state information report during the first opportunity on the configured grant uplink data channel in response to the UE not having the data to transmit during the first opportunity; and
receive a configuration of a first periodicity for transmitting channel state information reports to the base station, wherein the configuration indicates an index of the configured grant uplink data channel linked to the channel state information reports and associated with a second periodicity for transmitting the data to the base station, wherein the first periodicity is an integer multiple of the second periodicity.

18. The apparatus of claim 14, wherein the instructions to transmit the data and the channel state information report during the first opportunity on the configured grant uplink data channel are executable by the processor to cause the apparatus to:
  encode the data and the channel state information report using different encoding schemes;
  map the data and the channel state information report to different resource elements; and
  multiplex the data and the channel state information report during the first opportunity on the configured grant uplink data channel.

19. An apparatus for wireless communication at a user equipment (UE), comprising:
  a processor,
  memory coupled with the processor; and
  instructions stored in the memory and executable by the processor to cause the apparatus to:
    identify that the UE is configured for transmitting a channel state information report to a base station on a configured grant uplink data channel;
    identify a first opportunity for transmitting data and the channel state information report on the configured grant uplink data channel;
    determine whether the UE has the data to transmit during the first opportunity; and
    transmit the data and the channel state information report on the configured grant uplink data channel during the first opportunity in response to the UE having the data to transmit during the first opportunity;
    wherein the instructions to transmit the channel state information report during the first opportunity on the configured grant uplink data channel are executable by the processor to cause the apparatus to: transmit the channel state information report in a medium access control (MAC) control element (MAC-CE) during the first opportunity on the configured grant uplink data channel, wherein the channel state information report is transmitted without a precoding matrix indicator; and
  wherein the instructions are further executable by the processor to cause the apparatus to:
    determine a channel quality indicator to include in the channel state information report based at least in part on a previous precoding matrix indicator reported in aperiodic channel state information feedback or a precoder matrix cycling over a codebook subset; and
  suppress transmission of the channel state information report during the first opportunity on the configured grant uplink data channel in response to the UE not having the data to transmit during the first opportunity.

20. The apparatus of claim 19, wherein the instructions are further executable by the processor to cause the apparatus to:
  transmit, in the medium access control (MAC) control element (MAC-CE), an indication of whether the channel quality indicator is based at least in part on the previous precoding matrix indicator reported in the aperiodic channel state information feedback or the precoder matrix cycling over the codebook subset.

21. An apparatus for wireless communication at a user equipment (UE), comprising:
  a processor,
  memory coupled with the processor; and
  instructions stored in the memory and executable by the processor to cause the apparatus to:
    identify a change of downlink channel conditions based at least in part on one or more downlink transmissions received from a base station;
    transmit a request for the UE to report channel state information to the base station based at least in part on the identifying;
    receive an indication that the UE is to report the channel state information to the base station based at least in part on transmitting the request;
    report the channel state information to the base station; and
    transmit the request in a medium access control (MAC) control element (MAC-CE) of a configured grant uplink data channel or in a dedicated control channel.

22. The apparatus of claim 21, wherein the instructions to identify the change of downlink channel conditions are executable by the processor to cause the apparatus to:
  determine that a channel quality indicator or precoding matrix indicator associated with the downlink channel conditions is different from a previously reported channel quality indicator or precoding matrix indicator.

23. An apparatus for wireless communication at a user equipment (UE), comprising:
  a processor,
  memory coupled with the processor; and
  instructions stored in the memory and executable by the processor to cause the apparatus to:
    identify a change of downlink channel conditions based at least in part on one or more downlink transmissions received from a base station;
    transmit a request for the UE to report channel state information to the base station based at least in part on the identifying;
    receive an indication that the UE is to report the channel state information to the base station based at least in part on transmitting the request; and
    report the channel state information to the base station;
    wherein the request for the UE to report the channel state information comprises a one-bit channel state information update request.

24. An apparatus for wireless communication at a base station, comprising:
  a processor,
  memory coupled with the processor; and
  instructions stored in the memory and executable by the processor to cause the apparatus to:
    receive, from a user equipment (UE), a request for the UE to report channel state information to the base station;
    transmit an indication that the UE is to report the channel state information to the base station based at least in part on receiving the request;
    receive the channel state information from the UE based at least in part on transmitting the indication; and
    receive the request in a medium access control (MAC) control element (MAC-CE) of a configured grant uplink data channel or in a dedicated control channel.

25. The apparatus of claim 24, wherein the instructions are further executable by the processor to cause the apparatus to:
  determine that previous channel state information received from the UE is invalid based at least in part on receiving the request for the UE to report the channel state information to the base station.

26. An apparatus for wireless communication at a base station, comprising:

a processor,
memory coupled with the processor; and
instructions stored in the memory and executable by the processor to cause the apparatus to:
- receive, from a user equipment (UE), a request for the UE to report channel state information to the base station;
- transmit an indication that the UE is to report the channel state information to the base station based at least in part on receiving the request; and
receive the channel state information from the UE based at least in part on transmitting the indication;
wherein the request for the UE to report the channel state information comprises a one-bit channel state information update request.

* * * * *